United States Patent [19]

Barnhill

[11] Patent Number: 6,157,921

[45] Date of Patent: Dec. 5, 2000

[54] ENHANCING KNOWLEDGE DISCOVERY USING SUPPORT VECTOR MACHINES IN A DISTRIBUTED NETWORK ENVIRONMENT

[75] Inventor: Stephen D. Barnhill, Savannah, Ga.

[73] Assignee: Barnhill Technologies, LLC, Savannah, Ga.

[21] Appl. No.: 09/305,345

[22] Filed: May 1, 1999

Related U.S. Application Data

[60] Provisional application No. 60/083,961, May 1, 1998.

[51] Int. Cl.[7] ............................. G06F 15/18; G06F 17/00
[52] U.S. Cl. ............................... 706/16; 706/19; 706/20; 706/45
[58] Field of Search .................................. 706/45, 20, 25, 706/19, 16; 705/26; 702/153

[56] References Cited

U.S. PATENT DOCUMENTS

| | | | |
|---|---|---|---|
| 5,649,068 | 7/1997 | Boser et al. | 706/12 |
| 5,809,144 | 9/1998 | Sirbu et al. | 705/26 |
| 5,950,146 | 9/1999 | Vapnik | 702/153 |

OTHER PUBLICATIONS

Properties of Support Vector Machines; Massimiliano Pontil, Alessandro VerriMassachusetts Institute of Technology Artificial Intelligence Laboratory and Center for Biological and Computational Learning Department of Brain and Cognitive Sciences, Aug. 1997.

Example–based Learning for View–based Human Face Detection; Kah–Kay Sung and Tomaso PoggioMassachusetts Institute of Technology Artificial Intelligence Laboratory and Center for Biological and Computational Learning Department of Brain and Cognitive Scien, 1995.

Experiments for an approach to language identification with conversational telephone speech Yonghong Yan; Barnard, E. Acoustics, Speech, and Signal Processing, 1996. ICASSP–96.Conference Proceedings., 1996 IEEE International Conference on vol.: 2, 1996, 1995.

(List continued on next page.)

*Primary Examiner*—Tariq R. Hafiz
*Assistant Examiner*—George Davis
*Attorney, Agent, or Firm*—Kilpatrick Stockton LLP

[57] ABSTRACT

A system and method for enhancing knowledge discovery from data using a learning machine in general and a support vector machine in particular in a distributed network environment. A customer may transmit training data, test data and live data to a vendor's server from a remote source, via a distributed network. The customer may also transmit to the server identification information such as a user name, a password and a financial account identifier. The training data, test data and live data may be stored in a storage device. Training data may then be pre-processed in order to add meaning thereto. Pre-processing data may involve transforming the data points and/or expanding the data points. By adding meaning to the data, the learning machine is provided with a greater amount of information for processing. With regard to support vector machines in particular, the greater the amount of information that is processed, the better generalizations about the data that may be derived. The learning machine is therefore trained with the pre-processed training data and is tested with test data that is pre-processed in the same manner. The test output from the learning machine is post-processed in order to determine if the knowledge discovered from the test data is desirable. Post-processing involves interpreting the test output into a format that may be compared with the test data. Live data is pre-processed and input into the trained and tested learning machine. The live output from the learning machine may then be post-processed into a computationally derived alpha-numerical classifier for interpretation by a human or computer automated process. Prior to transmitting the alpha numerical classifier to the customer via the distributed network, the server is operable to communicate with a financial institution for the purpose of receiving funds from a financial account of the customer identified by the financial account identifier.

27 Claims, 12 Drawing Sheets

OTHER PUBLICATIONS

An improved training algorithm for support vector machines; Osuna, E.; Freund, R.; Girosi, F. Neural Networks for Signal Processing [1997] VII. Proceedings of the 1997 IEEE Workshop, 1997, pp.: 276–285, 1997.

Training support vector machines: an application to face detection; Osuna, E.; Freund, R.; Girosit, F. Computer Vision and Pattern Recognition, 1997. Proceedings., 1997 IEEE Computer Society Conference on, 1997, pp.: 130–136, 1997.

Support Vector Machines: Training and Applications; Edgar Osuna, Robert Freund and Federico GirosiMassachusetts Institute of Technology Artificial Intelligence Laboratory and Center for Biological and Computational Learning Department of Brain and Cogniti, Mar. 1997.

Kato et al, "An Application of SVM: Alphanumeric Character Recognition", IEEE International Joint Conference on Neural Networks, Jun. 1989.

Schölkopf. et al, "Comparing Support Vector Machines with Gaussian Karnels to Radial Basis Function Classifiers", Nov. 1997.

IEEE Transactions on Signal Processing.

| 406a | 406b | 406c | 406d | 406e | 406f |
|---|---|---|---|---|---|
| 41 | 75 | 95 | 29 | 8 | 1 |
| 47 | 64 | 45 | 26 | 4 | 1 |
| 34 | 35 | 17 | 11 | 5 | 1 |
| 48 | 5 | 137 | 18 | 2 | 1 |
| 35 | 29 | 48 | 21 | 9 | 1 |
| 49 | 19 | 69 | 11 | 7 | 1 |
| 42 | 8 | 10 | 12 | 2 | 1 |
| 44 | 3 | 12 | 14 | 1 | 1 |
| 37 | 57 | 19 | 20 | 7 | 1 |
| 48 | 17 | 14 | 12 | 1 | 1 |
| 39 | 1 | 10 | 17 | 8 | 1 |
| 44 | 21 | 14 | 17 | 1 | 1 |
| 34 | 2 | 9 | 12 | 1 | 1 |
| 31 | 10 | 10 | 16 | 0 | 1 |
| 42 | 252 | 452 | 25 | 0 | 1 |
| 42 | 59 | 693 | 19 | 1 | -1 |
| 36 | 5 | 51 | 12 | 1 | -1 |
| 38 | 1 | 10 | 19 | 1 | -1 |
| 36 | 43 | 89 | 9 | 4 | -1 |
| 42 | 16 | 10 | 13 | 1 | -1 |
| 47 | 19 | 20 | 12 | 4 | -1 |
| 49 | 14 | 128 | 21 | 0 | -1 |
| 38 | 169 | 315 | 36 | 0 | -1 |
| 33 | 2 | 12 | 8 | 5 | -1 |
| 46 | 41 | 308 | 23 | 2 | -1 |
| 44 | 54 | 115 | 29 | 1 | -1 |
| 31 | 4 | 3 | 20 | 2 | -1 |
| 49 | 1 | 18 | 27 | 3 | -1 |
| 48 | 34 | 355 | 19 | 2 | -1 |
| 44 | 29 | 19 | 20 | 3 | -1 |
| 42 | 207 | 11 | 10 | 1 | -1 |
| 43 | 62 | 53 | 26 | 0 | -1 |
| 43 | 108 | 293 | 4 | 1 | -1 |
| 35 | 25 | 13 | 24 | 1 | -1 |
| 35 | 5 | 5 | 16 | 8 | -1 |
| 45 | 54 | 17 | 19 | 4 | -1 |
| 41 | 4 | 10 | 15 | 0 | -1 |
| 40 | 8 | 12 | 8 | 2 | -1 |
| 42 | 25 | 78 | 21 | 5 | -1 |
| 46 | 30 | 105 | 11 | 1 | -1 |
| 48 | 72 | 94 | 15 | 0 | -1 |
| 36 | 3 | 10 | 7 | 5 | -1 |
| 46 | 165 | 12 | 17 | 2 | -1 |
| 47 | 22 | 10 | 26 | 0 | -1 |
| 48 | 3 | 10 | 21 | 0 | -1 |
| 40 | 4 | 10 | 12 | | |
| 32 | 3 | 10 | 14 | 6 | 1 |
| 36 | 51 | 167 | 11 | 3 | 1 |
| 39 | 4 | 15 | 31 | 25 | 1 |
| 46 | 2 | 10 | 8 | 0 | 1 |
| 28 | 12 | 36 | 25 | 23 | 1 |
| 32 | 23 | 50 | 19 | 0 | 1 |
| 44 | 26 | 10 | 21 | 4 | 1 |
| 47 | 32 | 11 | 21 | 7 | 1 |
| 42 | 32 | 41 | 21 | 18 | -1 |
| 42 | 2 | 10 | 14 | 0 | -1 |
| 36 | 10 | 1 | 16 | 1 | -1 |
| 47 | 5 | 6 | 22 | 1 | -1 |
| 34 | 18 | 6 | 13 | 2 | -1 |
| 34 | 9 | 10 | 29 | 0 | -1 |
| 37 | 6 | 10 | 16 | 0 | -1 |
| 38 | 42 | 46 | 14 | 6 | -1 |
| 32 | 98 | 11 | 11 | 0 | -1 |
| 37 | 39 | 10 | 13 | 1 | -1 |
| 45 | 17 | 267 | 20 | 4 | -1 |
| 39 | 93 | 134 | 12 | 1 | -1 |
| 43 | 47 | 11 | 19 | 11 | -1 |
| 46 | 6 | 10 | 13 | 1 | -1 |
| 49 | 1 | 4 | 19 | 6 | -1 |
| 46 | 172 | 302 | 9 | 3 | -1 |

FIG.4

Vapnik's Polynomial

Alphas bounded up to 1000.
Input values will be individually scaled to be between 0 and 1.
SV zero threshold: 1e-16.
Margin threshold: 0.1
Objective zero tolerance: 1e-07
Degree of polynomial: 2.

Test set:
Total samples:     24
Positive samples:   8
of which errors:    4
Negative samples:  16
of which errors:    6

| 606a | 606a1 | 606a2 | 606a3 | 606b | 606b1 | 606b2 | 606b3 | 606c | 606c1 | 606c2 | 606c3 | 606d | 606d1 | 606d2 | 606d3 | 606e | 606e1 | 606e2 | 606e3 | 606f |
|---|---|---|---|---|---|---|---|---|---|---|---|---|---|---|---|---|---|---|---|---|
| 41 | 0 | 0 | 1 | 75 | 0 | 0 | 1 | 95 | 0 | 0 | 1 | 29 | 0 | 0 | 1 | 8 | 0 | 0 | 1 | 1 |
| 47 | 0 | 0 | 1 | 64 | 0 | 0 | 1 | 45 | 0 | 0 | 1 | 26 | 0 | 0 | 1 | 4 | 0 | 0 | 1 | 1 |
| 34 | 0 | 1 | 0 | 35 | 0 | 0 | 1 | 17 | 0 | 1 | 0 | 11 | 0 | 0 | 1 | 5 | 0 | 0 | 1 | 1 |
| 48 | 0 | 0 | 1 | 5 | 1 | 0 | 0 | 137 | 0 | 0 | 1 | 18 | 0 | 0 | 1 | 2 | 0 | 0 | 1 | 1 |
| 35 | 0 | 0 | 1 | 29 | 0 | 0 | 1 | 48 | 0 | 0 | 1 | 21 | 0 | 0 | 1 | 9 | 0 | 0 | 1 | 1 |
| 49 | 0 | 0 | 1 | 19 | 0 | 1 | 0 | 69 | 0 | 0 | 1 | 11 | 0 | 0 | 1 | 7 | 0 | 0 | 1 | 1 |
| 42 | 0 | 0 | 1 | 8 | 1 | 0 | 0 | 10 | 1 | 0 | 0 | 12 | 0 | 0 | 1 | 2 | 0 | 0 | 1 | 1 |
| 44 | 0 | 0 | 1 | 3 | 1 | 0 | 0 | 12 | 0 | 1 | 0 | 14 | 0 | 0 | 1 | 1 | 0 | 0 | 1 | 1 |
| 37 | 0 | 0 | 1 | 57 | 0 | 0 | 1 | 19 | 0 | 0 | 1 | 20 | 0 | 0 | 1 | 7 | 0 | 0 | 1 | 1 |
| 48 | 0 | 0 | 1 | 17 | 0 | 1 | 0 | 14 | 0 | 1 | 0 | 12 | 0 | 0 | 1 | 1 | 0 | 0 | 1 | 1 |
| 39 | 0 | 0 | 1 | 1 | 1 | 0 | 0 | 10 | 1 | 0 | 0 | 17 | 0 | 0 | 1 | 8 | 0 | 0 | 1 | 1 |
| 44 | 0 | 0 | 1 | 21 | 0 | 1 | 0 | 14 | 0 | 1 | 0 | 17 | 0 | 0 | 1 | 1 | 0 | 0 | 1 | 1 |
| 34 | 0 | 1 | 0 | 2 | 1 | 0 | 0 | 9 | 1 | 0 | 0 | 12 | 0 | 0 | 1 | 1 | 0 | 0 | 1 | 1 |
| 31 | 1 | 0 | 0 | 10 | 1 | 0 | 0 | 10 | 1 | 0 | 0 | 16 | 0 | 0 | 1 | 0 | 1 | 0 | 0 | 1 |
| 42 | 0 | 0 | 1 | 252 | 0 | 0 | 1 | 452 | 0 | 0 | 1 | 25 | 0 | 0 | 1 | 0 | 1 | 0 | 0 | 1 |
| 42 | 0 | 0 | 1 | 59 | 0 | 0 | 1 | 693 | 0 | 0 | 1 | 19 | 0 | 0 | 1 | 1 | 0 | 0 | 1 | -1 |
| 36 | 0 | 0 | 1 | 5 | 1 | 0 | 0 | 51 | 0 | 0 | 1 | 12 | 0 | 0 | 1 | 1 | 0 | 0 | 1 | -1 |
| 38 | 0 | 0 | 1 | 1 | 1 | 0 | 0 | 10 | 1 | 0 | 0 | 19 | 0 | 0 | 1 | 1 | 0 | 0 | 1 | -1 |
| 36 | 0 | 0 | 1 | 43 | 0 | 0 | 1 | 89 | 0 | 0 | 1 | 9 | 0 | 1 | 0 | 1 | 0 | 1 | 0 | -1 |
| 42 | 0 | 0 | 1 | 16 | 1 | 0 | 0 | 10 | 1 | 0 | 0 | 13 | 0 | 0 | 1 | 4 | 0 | 0 | 1 | -1 |
| 47 | 0 | 0 | 1 | 19 | 0 | 1 | 0 | 20 | 0 | 0 | 1 | 12 | 0 | 0 | 1 | 1 | 0 | 0 | 1 | -1 |
| 49 | 0 | 0 | 1 | 14 | 1 | 0 | 0 | 128 | 0 | 0 | 1 | 21 | 0 | 0 | 1 | 4 | 0 | 0 | 1 | -1 |
| 38 | 0 | 0 | 1 | 169 | 0 | 0 | 1 | 315 | 0 | 0 | 1 | 36 | 0 | 0 | 1 | 0 | 1 | 0 | 0 | -1 |
| 33 | 1 | 0 | 0 | 2 | 1 | 0 | 0 | 12 | 0 | 1 | 0 | 8 | 0 | 1 | 0 | 0 | 1 | 0 | 0 | -1 |
| 46 | 0 | 0 | 1 | 41 | 0 | 0 | 1 | 308 | 0 | 0 | 1 | 23 | 0 | 0 | 1 | 5 | 0 | 0 | 1 | -1 |
| 44 | 0 | 0 | 1 | 54 | 0 | 0 | 1 | 115 | 0 | 0 | 1 | 29 | 0 | 0 | 1 | 2 | 0 | 0 | 1 | -1 |
| 31 | 1 | 0 | 0 | 4 | 1 | 0 | 0 | 3 | 1 | 0 | 0 | 20 | 0 | 0 | 1 | 1 | 0 | 0 | 1 | -1 |
| 49 | 0 | 0 | 1 | 1 | 1 | 0 | 0 | 18 | 0 | 1 | 0 | 27 | 0 | 0 | 1 | 2 | 0 | 0 | 1 | -1 |
| 48 | 0 | 0 | 1 | 34 | 0 | 0 | 1 | 355 | 0 | 0 | 1 | 19 | 0 | 0 | 1 | 3 | 0 | 0 | 1 | -1 |
| 44 | 0 | 0 | 1 | 29 | 0 | 0 | 1 | 19 | 0 | 0 | 1 | 20 | 0 | 1 | 1 | 2 | 0 | 0 | 1 | -1 |
| 42 | 0 | 0 | 1 | 207 | 0 | 0 | 1 | 11 | 0 | 1 | 0 | 10 | 0 | 0 | 1 | 3 | 0 | 0 | 1 | -1 |
| 43 | 0 | 0 | 1 | 62 | 0 | 0 | 1 | 53 | 0 | 0 | 1 | 26 | 0 | 0 | 1 | 1 | 0 | 0 | 1 | -1 |
| 43 | 0 | 0 | 1 | 108 | 0 | 0 | 1 | 293 | 0 | 0 | 1 | 4 | 1 | 0 | 0 | 0 | 1 | 0 | 0 | -1 |
| 35 | 0 | 0 | 1 | 25 | 0 | 0 | 1 | 13 | 0 | 1 | 0 | 24 | 0 | 1 | 1 | 1 | 0 | 0 | 1 | -1 |
| 35 | 0 | 0 | 1 | 5 | 1 | 0 | 0 | 5 | 1 | 0 | 0 | 16 | 0 | 0 | 1 | 1 | 0 | 0 | 1 | -1 |
| 45 | 0 | 0 | 1 | 54 | 0 | 0 | 1 | 17 | 0 | 0 | 1 | 19 | 0 | 0 | 1 | 8 | 0 | 0 | 1 | -1 |
| 41 | 0 | 0 | 1 | 4 | 1 | 0 | 0 | 10 | 1 | 0 | 0 | 15 | 0 | 0 | 1 | 4 | 0 | 0 | 1 | -1 |
| 40 | 0 | 0 | 1 | 8 | 1 | 0 | 0 | 12 | 0 | 1 | 0 | 8 | 0 | 1 | 0 | 0 | 1 | 0 | 0 | -1 |
| 42 | 0 | 0 | 1 | 25 | 0 | 0 | 1 | 78 | 0 | 0 | 1 | 21 | 0 | 0 | 1 | 2 | 0 | 0 | 1 | -1 |
| 46 | 0 | 0 | 1 | 30 | 0 | 0 | 1 | 105 | 0 | 0 | 1 | 11 | 0 | 0 | 1 | 5 | 0 | 0 | 1 | -1 |
| 48 | 0 | 0 | 1 | 72 | 0 | 0 | 1 | 94 | 0 | 0 | 1 | 15 | 0 | 0 | 1 | 1 | 0 | 0 | 1 | -1 |
| 36 | 0 | 0 | 1 | 3 | 1 | 0 | 0 | 10 | 1 | 0 | 0 | 7 | 0 | 1 | 0 | 0 | 1 | 0 | 0 | -1 |
| 46 | 0 | 0 | 1 | 165 | 0 | 0 | 1 | 12 | 0 | 1 | 0 | 17 | 0 | 0 | 1 | 5 | 0 | 0 | 1 | -1 |
| 47 | 0 | 0 | 1 | 22 | 0 | 0 | 1 | 10 | 1 | 0 | 0 | 26 | 0 | 0 | 1 | 2 | 0 | 0 | 1 | -1 |
| 48 | 0 | 0 | 1 | 3 | 1 | 0 | 0 | 10 | 1 | 0 | 0 | 21 | 0 | 0 | 1 | 0 | 1 | 0 | 0 | -1 |
| 40 | 0 | 0 | 1 | 4 | 1 | 0 | 0 | 10 | 1 | 0 | 0 | 12 | 0 | 0 | 1 | 0 | 1 | 0 | 0 | -1 |
| 32 | 1 | 0 | 0 | 3 | 1 | 0 | 0 | 10 | 1 | 0 | 0 | 14 | 0 | 0 | 1 | 6 | 0 | 0 | 1 | 1 |
| 36 | 0 | 0 | 1 | 51 | 0 | 0 | 1 | 167 | 0 | 0 | 1 | 11 | 0 | 0 | 1 | 3 | 0 | 0 | 1 | 1 |
| 39 | 0 | 0 | 1 | 4 | 1 | 0 | 0 | 15 | 0 | 1 | 0 | 31 | 0 | 0 | 1 | 25 | 0 | 0 | 1 | 1 |
| 46 | 0 | 0 | 0 | 2 | 1 | 0 | 0 | 10 | 1 | 0 | 0 | 8 | 0 | 1 | 0 | 0 | 1 | 0 | 0 | 1 |
| 28 | 1 | 0 | 0 | 12 | 1 | 0 | 0 | 36 | 0 | 0 | 1 | 25 | 0 | 0 | 1 | 23 | 0 | 0 | 1 | 1 |
| 32 | 1 | 0 | 0 | 23 | 0 | 0 | 1 | 50 | 0 | 0 | 1 | 19 | 0 | 0 | 1 | 0 | 1 | 0 | 0 | 1 |
| 44 | 0 | 0 | 1 | 26 | 0 | 0 | 1 | 10 | 1 | 0 | 0 | 21 | 0 | 0 | 1 | 4 | 0 | 0 | 1 | 1 |
| 47 | 0 | 0 | 1 | 32 | 0 | 0 | 1 | 11 | 0 | 0 | 1 | 21 | 0 | 0 | 1 | 7 | 0 | 0 | 1 | 1 |
| 42 | 0 | 0 | 1 | 32 | 0 | 0 | 1 | 41 | 0 | 0 | 1 | 21 | 0 | 0 | 1 | 18 | 0 | 0 | 1 | -1 |
| 42 | 0 | 0 | 1 | 2 | 1 | 0 | 0 | 10 | 1 | 0 | 0 | 14 | 0 | 0 | 1 | 0 | 1 | 0 | 0 | -1 |
| 36 | 0 | 0 | 1 | 10 | 1 | 0 | 0 | 1 | 1 | 0 | 0 | 16 | 0 | 0 | 1 | 1 | 0 | 0 | 1 | -1 |
| 47 | 0 | 0 | 1 | 5 | 1 | 0 | 0 | 6 | 1 | 0 | 0 | 22 | 0 | 0 | 1 | 1 | 0 | 0 | 1 | -1 |
| 34 | 0 | 1 | 0 | 18 | 0 | 1 | 0 | 6 | 1 | 0 | 0 | 13 | 0 | 0 | 1 | 2 | 0 | 0 | 1 | -1 |
| 34 | 0 | 1 | 0 | 9 | 1 | 0 | 0 | 10 | 1 | 0 | 0 | 29 | 0 | 0 | 1 | 0 | 1 | 0 | 0 | -1 |
| 37 | 0 | 0 | 1 | 6 | 1 | 0 | 0 | 10 | 1 | 0 | 0 | 16 | 0 | 0 | 1 | 0 | 1 | 0 | 0 | -1 |
| 38 | 0 | 0 | 1 | 42 | 0 | 0 | 1 | 46 | 0 | 0 | 1 | 14 | 0 | 0 | 1 | 6 | 0 | 0 | 1 | -1 |
| 32 | 1 | 0 | 0 | 98 | 0 | 0 | 1 | 11 | 0 | 0 | 1 | 11 | 0 | 0 | 1 | 0 | 1 | 0 | 0 | -1 |
| 37 | 0 | 0 | 1 | 39 | 0 | 0 | 1 | 10 | 1 | 0 | 0 | 13 | 0 | 0 | 1 | 1 | 0 | 0 | 1 | -1 |
| 45 | 0 | 0 | 1 | 17 | 0 | 1 | 0 | 267 | 0 | 0 | 1 | 20 | 0 | 0 | 1 | 4 | 0 | 0 | 1 | -1 |
| 39 | 0 | 0 | 1 | 93 | 0 | 0 | 1 | 134 | 0 | 0 | 1 | 12 | 0 | 0 | 1 | 1 | 0 | 0 | 1 | -1 |
| 43 | 0 | 0 | 1 | 47 | 0 | 0 | 1 | 11 | 0 | 0 | 1 | 19 | 0 | 0 | 1 | 11 | 0 | 0 | 1 | -1 |
| 46 | 0 | 0 | 1 | 6 | 1 | 0 | 0 | 10 | 1 | 0 | 0 | 13 | 0 | 0 | 1 | 1 | 0 | 0 | 1 | -1 |
| 49 | 0 | 0 | 1 | 1 | 1 | 0 | 0 | 4 | 1 | 0 | 0 | 19 | 0 | 0 | 1 | 6 | 0 | 0 | 1 | -1 |
| 46 | 0 | 0 | 1 | 172 | 0 | 0 | 1 | 302 | 0 | 0 | 1 | 9 | 0 | 1 | 0 | 3 | 0 | 0 | 1 | -1 |

FIG. 6

Vapnik's Polynomial

Alphas bounded up to 1000.
Input values will be individually scaled to be between 0 and 1.
SV zero threshold: 1e-16.
Margin threshold: 0.1
Objective zero tolerance: 1e-07
Degree of polynomial: 2.

Test set:
Total samples:      24
Positive samples:    8
of which errors:     4
Negative samples:   16
of which errors:     4

Valpik's Polynomial

Alphas bounded up to 1000.
Input values will not be scaled.
SV zero threshold: 1e-16.
Margin threshold: 0.1
Objective zero tolerance: 1e-07
Degree of Polynomial: 2.

Test set:
Total samples: 24
Positive samples: 8
of which errors: 2
Negative samples: 16
of which errors: 4

*902*

Simple Dot Product

Alphas bounded up to 1000.
Input values will not be scaled.
SV zero threshold: 1e-16.
Margin threshold: 0.1
Objective zero tolerance: 1e-07

Test set:
Total samples: 24
Positive samples: 8
of which errors: 6
Negative samples: 16
of which errors: 3

FIG. 9

ENHANCING KNOWLEDGE DISCOVERY USING SUPPORT VECTOR MACHINES IN A DISTRIBUTED NETWORK ENVIRONMENT

RELATED APPLICATIONS

This application claims the benefit of U.S. Provisional Patent Application Ser. No. 60/083,961, filed May 1, 1998.

TECHNICAL FIELD

The present invention relates to the use of learning machines to discover knowledge from data. More particularly, the present invention relates to optimizations for learning machines and associated input and output data, in order to enhance the knowledge discovered from data.

BACKGROUND OF THE INVENTION

Knowledge discovery is the most desirable end product of data collection. Recent advancements in database technology have lead to an explosive growth in systems and methods for generating, collecting and storing vast amounts of data. While database technology enables efficient collection and storage of large data sets, the challenge of facilitating human comprehension of the information in this data is growing ever more difficult. With many existing techniques the problem has become unapproachable. Thus, there remains a need for a new generation of automated knowledge discovery tools.

As a specific example, the Human Genome Project is populating a multi-gigabyte database describing the human genetic code. Before this mapping of the human genome is complete (expected in 2003), the size of the database is expected to grow significantly. The vast amount of data in such a database overwhelms traditional tools for data analysis, such as spreadsheets and ad hoc queries. Traditional methods of data analysis may be used to create informative reports from data, but do not have the ability to intelligently and automatically assist humans in analyzing and finding patterns of useful knowledge in vast amounts of data. Likewise, using traditionally accepted reference ranges and standards for interpretation, it is often impossible for humans to identify patterns of useful knowledge even with very small amounts of data.

One recent development that has been shown to be effective in some examples of machine learning is the back-propagation neural network. Back-propagation neural networks are learning machines that may be trained to discover knowledge in a data set that is not readily apparent to a human. However, there are various problems with back-propagation neural network approaches that prevent neural networks from being well-controlled learning machines. For example, a significant drawback of back-propagation neural networks is that the empirical risk function may have many local minimums, a case that can easily obscure the optimal solution from discovery by this technique. Standard optimization procedures employed by back-propagation neural networks may convergence to a minimum, but the neural network method cannot guarantee that even a localized minimum is attained much less the desired global minimum. The quality of the solution obtained from a neural network depends on many factors. In particular the skill of the practitioner implementing the neural network determines the ultimate benefit, but even factors as seemingly benign as the random selection of initial weights can lead to poor results. Furthermore, the convergence of the gradient based method used in neural network learning is inherently slow. A further drawback is that the sigmoid function has a scaling factor, which affects the quality of approximation. Possibly the largest limiting factor of neural networks as related to knowledge discovery is the "curse of dimensionality" associated with the disproportionate growth in required computational time and power for each additional feature or dimension in the training data.

The shortcomings of neural networks are overcome using support vector machines. In general terms, a support vector machine maps input vectors into high dimensional feature space through non-linear mapping function, chosen a priori. In this high dimensional feature space, an optimal separating hyperplane is constructed. The optimal hyperplane is then used to determine things such as class separations, regression fit, or accuracy in density estimation.

Within a support vector machine, the dimensionally of the feature space may be huge. For example, a fourth degree polynomial mapping function causes a 200 dimensional input space to be mapped into a 1.6 billionth dimensional feature space. The kernel trick and the Vapnik-Chervonenkis dimension allow the support vector machine to thwart the "curse of dimensionality" limiting other methods and effectively derive generalizable answers from this very high dimensional feature space.

If the training vectors are separated by the optimal hyperplane (or generalized optimal hyperplane), then the expectation value of the probability of committing an error on a test example is bounded by the examples in the training set. This bound depends neither on the dimensionality of the feature space, nor on the norm of the vector of coefficients, nor on the bound of the number of the input vectors. Therefore, if the optimal hyperplane can be constructed from a small number of support vectors relative to the training set size, the generalization ability will be high, even in infinite dimensional space.

As such, support vector machines provide a desirable solution for the problem of discovering knowledge from vast amounts of input data. However, the ability of a support vector machine to discover knowledge from a data set is limited in proportion to the information included within the training data set. Accordingly, there exists a need for a system and method for pre-processing data so as to augment the training data to maximize the knowledge discovery by the support vector machine.

Furthermore, the raw output from a support vector machine may not fully disclose the knowledge in the most readily interpretable form. Thus, there further remains a need for a system and method for post-processing data output from a support vector machine in order to maximize the value of the information delivered for human or further automated processing.

In addition, a the ability of a support vector machine to discover knowledge from data is limited by the selection of a kernel. Accordingly, there remains a need for an improved system and method for selecting and/or creating a desired kernel for a support vector machine.

SUMMARY OF THE INVENTION

The present invention meets the above described needs by providing a system and method for enhancing knowledge discovered from data using a learning machine in general and a support vector machine in particular. A training data set is pre-processed in order to allow the most advantageous application of the learning machine. Each training data point comprises a vector having one or more coordinates. Pre-processing the training data set may comprise identifying missing or erroneous data points and taking appropriate steps to correct the flawed data or as appropriate remove the observation or the entire field from the scope of the problem. Pre-processing the training data set may also comprise adding dimensionality to each training data point by adding one or more new coordinates to the vector. The new coordinates added to the vector may be derived by applying a transformation to one or more of the original coordinates. The transformation may be based on expert knowledge, or may be computationally derived. In a situation where the training data set comprises a continuous variable, the transformation may comprise optimally categorizing the continuous variable of the training data set.

The support vector machine is trained using the pre-processed training data set. In this manner, the additional representations of the training data provided by the preprocessing may enhance the learning machine's ability to discover knowledge therefrom. In the particular context of support vector machines, the greater the dimensionality of the training set, the higher the quality of the generalizations that may be derived therefrom. When the knowledge to be discovered from the data relates to a regression or density estimation or where the training output comprises a continuous variable, the training output may be post-processed by optimally categorizing the training output to derive categorizations from the continuous variable.

A test data set is pre-processed in the same manner as was the training data set. Then, the trained learning machine is tested using the pre-processed test data set. A test output of the trained learning machine may be post-processing to determine if the test output is an optimal solution. Post-processing the test output may comprise interpreting the test output into a format that may be compared with the test data set. Alternative postprocessing steps may enhance the human interpretability or suitability for additional processing of the output data.

In the context of a support vector machine, the present invention also provides for the selection of a kernel prior to training the support vector machine. The selection of a kernel may be based on prior knowledge of the specific problem being addressed or analysis of the properties of any available data to be used with the learning machine and is typically dependant on the nature of the knowledge to be discovered from the data. Optionally, an iterative process comparing postprocessed training outputs or test outputs can be applied to make a determination as to which configuration provides the optimal solution. If the test output is not the optimal solution, the selection of the kernel may be adjusted and the support vector machine may be retrained and retested. When it is determined that the optimal solution has been identified, a live data set may be collected and pre-processed in the same manner as was the training data set. The pre-processed live data set is input into the learning machine for processing. The live output of the learning machine may then be post-processed by interpreting the live output into a computationally derived alphanumeric classifier.

In an exemplary embodiment a system is provided enhancing knowledge discovered from data using a support vector machine. The exemplary system comprises a storage device for storing a training data set and a test data set, and a processor for executing a support vector machine. The processor is also operable for collecting the training data set from the database, pre-processing the training data set to enhance each of a plurality of training data points, training the support vector machine using the pre-processed training data set, collecting the test data set from the database, pre-processing the test data set in the same manner as was the training data set, testing the trained support vector machine using the pre-processed test data set, and in response to receiving the test output of the trained support vector machine, post-processing the test output to determine if the test output is an optimal solution. The exemplary system may also comprise a communications device for receiving the test data set and the training data set from a remote source. In such a case, the processor may be operable to store the training data set in the storage device prior pre-processing of the training data set and to store the test data set in the storage device prior pre-processing of the test data set. The exemplary system may also comprise a display device for displaying the post-processed test data. The processor of the exemplary system may further be operable for performing each additional function described above. The communications device may be further operable to send a computationally derived alphanumeric classifier to a remote source.

In an exemplary embodiment, a system and method are provided for enhancing knowledge discovery from data using multiple learning machines in general and multiple support vector machines in particular. Training data for a learning machine is pre-processed in order to add meaning thereto. Pre-processing data may involve transforming the data points and/or expanding the data points. By adding meaning to the data, the learning machine is provided with a greater amount of information for processing. With regard to support vector machines in particular, the greater the amount of information that is processed, the better generalizations about the data that may be derived. Multiple support vector machines, each comprising distinct kernels, are trained with the pre-processed training data and are tested with test data that is pre-processed in the same manner. The test outputs from multiple support vector machines are compared in order to determine which of the test outputs if any represents a optimal solution. Selection of one or more kernels may be adjusted and one or more support vector machines may be retrained and retested. When it is determined that an optimal solution has been achieved, live data is pre-processed and input into the support vector machine comprising the kernel that produced the optimal solution. The live output from the learning machine may then be post-processed into a computationally derived alphanumerical classifier for interpretation by a human or computer automated process.

In another exemplary embodiment, a system and method are provided for optimally categorizing a continuous variable. A data set representing a continuous variable comprises data points that each comprise a sample from the continuous variable and a class identifier. A number of distinct class identifiers within the data set is determined and a number of candidate bins is determined based on the range of the samples and a level of precision of the samples within the data set. Each candidate bin represents a sub-range of the samples. For each candidate bin, the entropy of the data points falling within the candidate bin is calculated. Then, for each sequence of candidate bins that have a minimized collective entropy, a cutoff point in the range of samples is defined to be at the boundary of the last candidate bin in the sequence of candidate bins. As an iterative process, the collective entropy for different combinations of sequential candidate bins may be calculated. Also the number of defined cutoff points may be adjusted in order to determine the optimal number of cutoff point, which is based on a calculation of minimal entropy. As mentioned, the exemplary system and method for optimally categorizing a continuous variable may be used for pre-processing data to be input into a learning machine and for post-processing output of a learning machine.

In still another exemplary embodiment, a system and method are provided for for enhancing knowledge discovery from data using a learning machine in general and a support vector machine in particular in a distributed network environment. A customer may transmit training data, test data and live data to a vendor's server from a remote source, via a distributed network. The customer may also transmit to the server identification information such as a user name, a password and a financial account identifier. The training data, test data and live data may be stored in a storage device. Training data may then be pre-processed in order to add meaning thereto. Pre-processing data may involve transforming the data points and/or expanding the data points. By adding meaning to the data, the learning machine is provided with a greater amount of information for processing. With regard to support vector machines in particular, the greater the amount of information that is processed, the better generalizations about the data that may be derived. The learning machine is therefore trained with the pre-processed training data and is tested with test data that is pre-processed in the same manner. The test output from the learning machine is post-processed in order to determine if the knowledge discovered from the test data is desirable. Post-processing involves interpreting the test output into a format that may be compared with the test data. Live data is pre-processed and input into the trained and tested learning machine. The live output from the learning machine may then be post-processed into a computationally derived alpha-numerical classifier for interpretation by a human or computer automated process. Prior to transmitting the alpha numerical classifier to the customer via the distributed network, the server is operable to communicate with a financial institution for the purpose of receiving funds from a financial account of the customer identified by the financial account identifier.

BRIEF DESCRIPTION OF THE DRAWINGS

FIG. 4 illustrates an exemplary unexpanded data set that may be input into a support vector machine.

FIG. 5 illustrates an exemplary post-processed output generated by a support vector machine using the data set of FIG. 4.

FIG. 6 illustrates an exemplary expanded data set that may be input into a support vector machine.

FIG. 7 illustrates an exemplary post-processed output generated by a support vector machine using the data set of FIG. 6.

FIG. 9 is a comparison of exemplary post-processed output from a first support vector machine comprising a linear kernel and a second support vector machine comprising a polynomial kernel.

DETAILED DESCRIPTION OF EXEMPLARY EMBODIMENTS

The present invention provides improved methods for discovering knowledge from data using learning machines. While several examples of learning machines exist and advancements are expected in this field, the exemplary embodiments of the present invention focus on the support vector machine. As is known in the art, learning machines comprise algorithms that may be trained to generalize using data with known outcomes. Trained learning machine algorithms may then applied to cases of unknown outcome for prediction. For example, a learning machine may be trained to recognize patterns in data, estimate regression in data or estimate probability density within data. Learning machines may be trained to solve a wide variety of problems as known to those of ordinary skill in the art. A trained learning machine may optionally be tested using test data to ensure that its output is validated within an acceptable margin of error. Once a learning machine is trained and tested, live data may be input therein. The live output of a learning machine comprises knowledge discovered from all of the training data as applied to the live data.

A first aspect of the present invention seeks to enhance knowledge discovery by optionally pre-processing data prior to using the data to train a learning machine and/or optionally post-processing the output from a learning machine. Generally stated, pre-processing data comprises reformatting or augmenting the data in order to allow the learning machine to be applied most advantageously. Similarly, post-processing involves interpreting the output of a learning machine in order to discover meaningful characteristics thereof. The meaningful characteristics to be ascertained from the output may be problem or data specific. Post-processing involves interpreting the output into a form that comprehendible by a human or one that is comprehendible by a computer.

Figure 1:
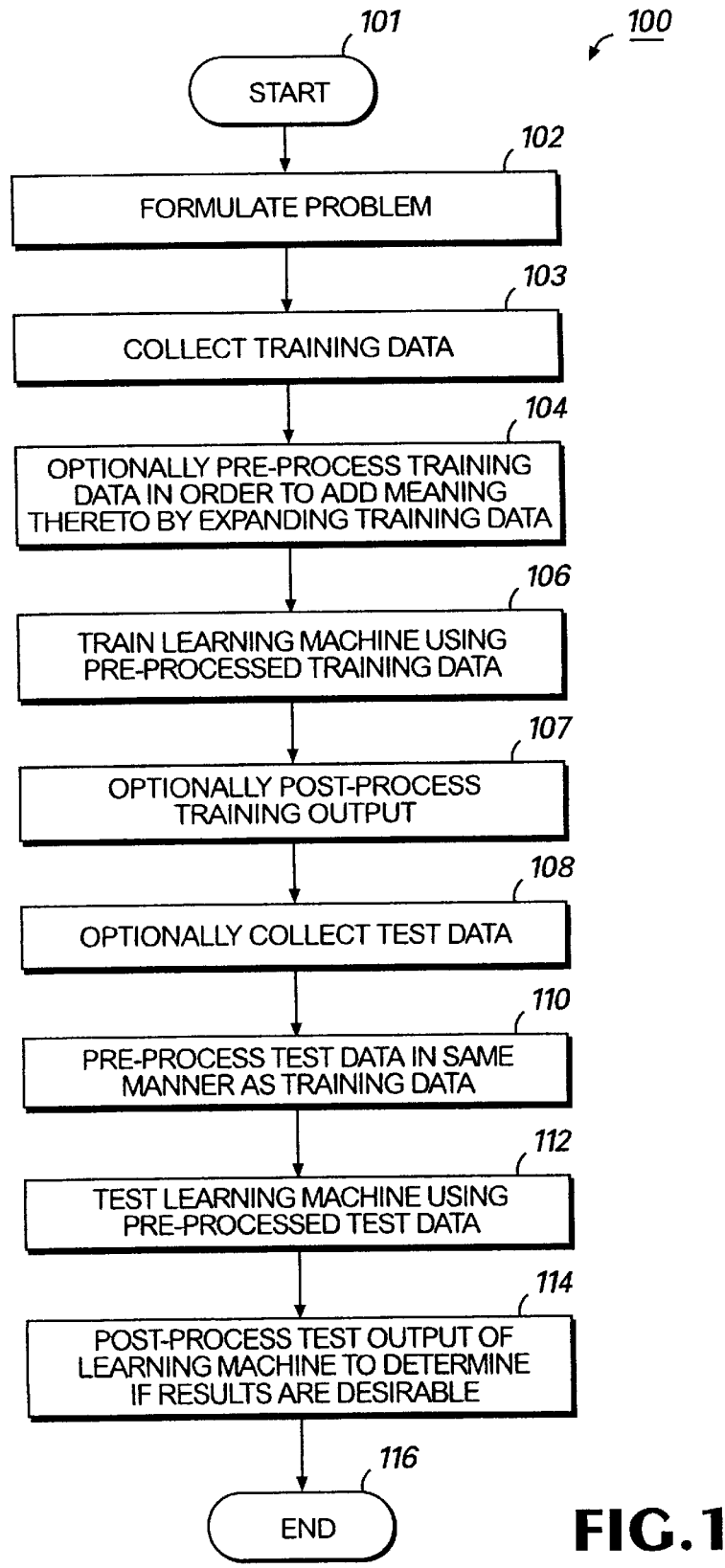
FIG. 1 is a flowchart illustrating an exemplary general method for increasing knowledge that may be discovered from data using a learning machine.

Exemplary embodiments of the present invention will hereinafter be described with reference to the drawing, in which like numerals indicate like elements throughout the several figures. FIG. 1 is a flowchart illustrating a general method 100 for enhancing knowledge discovery using learning machines. The method 100 begins at starting block 101 and progresses to step 102 where a specific problem is formalized for application of knowledge discovery through machine learning. Particularly important is a proper formulation of the desired output of the learning machine. For instance, in predicting future performance of an individual equity instrument, or a market index, a learning machine is likely to achieve better performance when predicting the expected future change rather than predicting the future price level. The future price expectation can later be derived in a post-processing step as will be discussed later in this specification.

After problem formalization, step 103 addresses training data collection. Training data comprises a set of data points having known characteristics. Training data may be collected from one or more local and/or remote sources. The collection of training data may be accomplished manually or by way of an automated process, such as known electronic data transfer methods. Accordingly, an exemplary embodiment of the present invention may be implemented in a networked computer environment. Exemplary operating environments for implementing various embodiments of the present invention will be described in detail with respect to FIGS. 10–12.

Next, at step 104 the collected training data is optionally pre-processed in order to allow the learning machine to be applied most advantageously toward extraction of the knowledge inherent to the training data. During this preprocessing stage the training data can optionally be expanded through transformations, combinations or manipulation of individual or multiple measures within the records of the training data. As used herein, expanding data is meant to refer to altering the dimensionality of the input data by changing the number of observations available to determine each input point (alternatively, this could be described as adding or deleting columns within a database table). By way of illustration, a data point may comprise the coordinates (1,4,9). An expanded version of this data point may result in the coordinates (1,1,4,2,9,3). In this example, it may be seen that the coordinates added to the expanded data point are based on a square-root transformation of the original coordinates. By adding dimensionality to the data point, this expanded data point provides a varied representation of the input data that is potentially more meaningful for knowledge discovery by a learning machine. Data expansion in this sense affords opportunities for learning machines to discover knowledge not readily apparent in the unexpanded training data.

Expanding data may comprise applying any type of meaningful transformation to the data and adding those transformations to the original data. The criteria for determining whether a transformation is meaningful may depend on the input data itself and/or the type of knowledge that is sought from the data. Illustrative types of data transformations include: addition of expert information; labeling; binary conversion; sine, cosine, tangent, cotangent, and other trigonometric transformation; clustering; scaling; probabilistic and statistical analysis; significance testing; strength testing; searching for 2-D regularities; Hidden Markov Modeling; identification of equivalence relations; application of contingency tables; application of graph theory principles; creation of vector maps; addition, subtraction, multiplication, division, application of polynomial equations and other algebraic transformations; identification of proportionality; determination of discriminatory power; etc. In the context of medical data, potentially meaningful transformations include: association with known standard medical reference ranges; physiologic truncation; physiologic combinations; biochemical combinations; application of heuristic rules; diagnostic criteria determinations; clinical weighting systems; diagnostic transformations; clinical transformations; application of expert knowledge; labeling techniques; application of other domain knowledge; Bayesian network knowledge; etc. These and other transformations, as well as combinations thereof, will occur to those of ordinary skill in the art.

Those skilled in the art should also recognize that data transformations may be performed without adding dimensionality to the data points. For example a data point may comprise the coordinate (A, B, C). A transformed version of this data point may result in the coordinates (1, 2, 3), where the coordinate "1" has some known relationship with the coordinate "A," the coordinate "2" has some known relationship with the coordinate "B," and the coordinate "3" has some known relationship with the coordinate "C." A transformation from letters to numbers may be required, for example, if letters are not understood by a learning machine. Other types of transformations are possible without adding dimensionality to the data points, even with respect to data that is originally in numeric form. Furthermore, it should be appreciated that pre-processing data to add meaning thereto may involve analyzing incomplete, corrupted or otherwise "dirty" data. A learning machine cannot process "dirty" data in a meaningful manner. Thus, a pre-processing step may involve cleaning up a data set in order to remove, repair or replace dirty data points.

Returning to FIG. 1, the exemplary method 100 continues at step 106, where the learning machine is trained using the pre-processed data. As is known in the art, a learning machine is trained by adjusting its operating parameters until a desirable training output is achieved. The determination of whether a training output is desirable may be accomplished either manually or automatically by comparing the training output to the known characteristics of the training data. A learning machine is considered to be trained when its training output is within a predetermined error threshold from the known characteristics of the training data. In certain situations, it may be desirable, if not necessary, to post-process the training output of the learning machine at step 107. As mentioned, post-processing the output of a learning machine involves interpreting the output into a meaningful form. In the context of a regression problem, for example, it may be necessary to determine range categorizations for the output of a learning machine in order to determine if the input data points were correctly categorized. In the example of a pattern recognition problem, it is often not necessary to post-process the training output of a learning machine.

At step 108, test data is optionally collected in preparation for testing the trained learning machine. Test data may be collected from one or more local and/or remote sources. In practice, test data and training data may be collected from the same source(s) at the same time. Thus, test data and training data sets can be divided out of a common data set and stored in a local storage medium for use as different input data sets for a learning machine. Regardless of how the test data is collected, any test data used must be preprocessed at step 110 in the same manner as was the training data. As should be apparent to those skilled in the art, a proper test of the learning may only be accomplished by using testing data of the same format as the training data. Then, at step 112 the learning machine is tested using the pre-processed test data, if any. The test output of the learning machine is optionally post-processed at step 114 in order to determine if the results are desirable. Again, the post processing step involves interpreting the test output into a meaningful form. The meaningful form may be one that is comprehendible by a human or one that is comprehendible by a computer. Regardless, the test output must be post-processed into a form which may be compared to the test data to determine whether the results were desirable. Examples of post-processing steps include but are not limited of the following: optimal categorization determinations, scaling techniques (linear and non-linear), transformations (linear and non-linear), and probability estimations. The method 100 ends at step 116.

Figure 2:
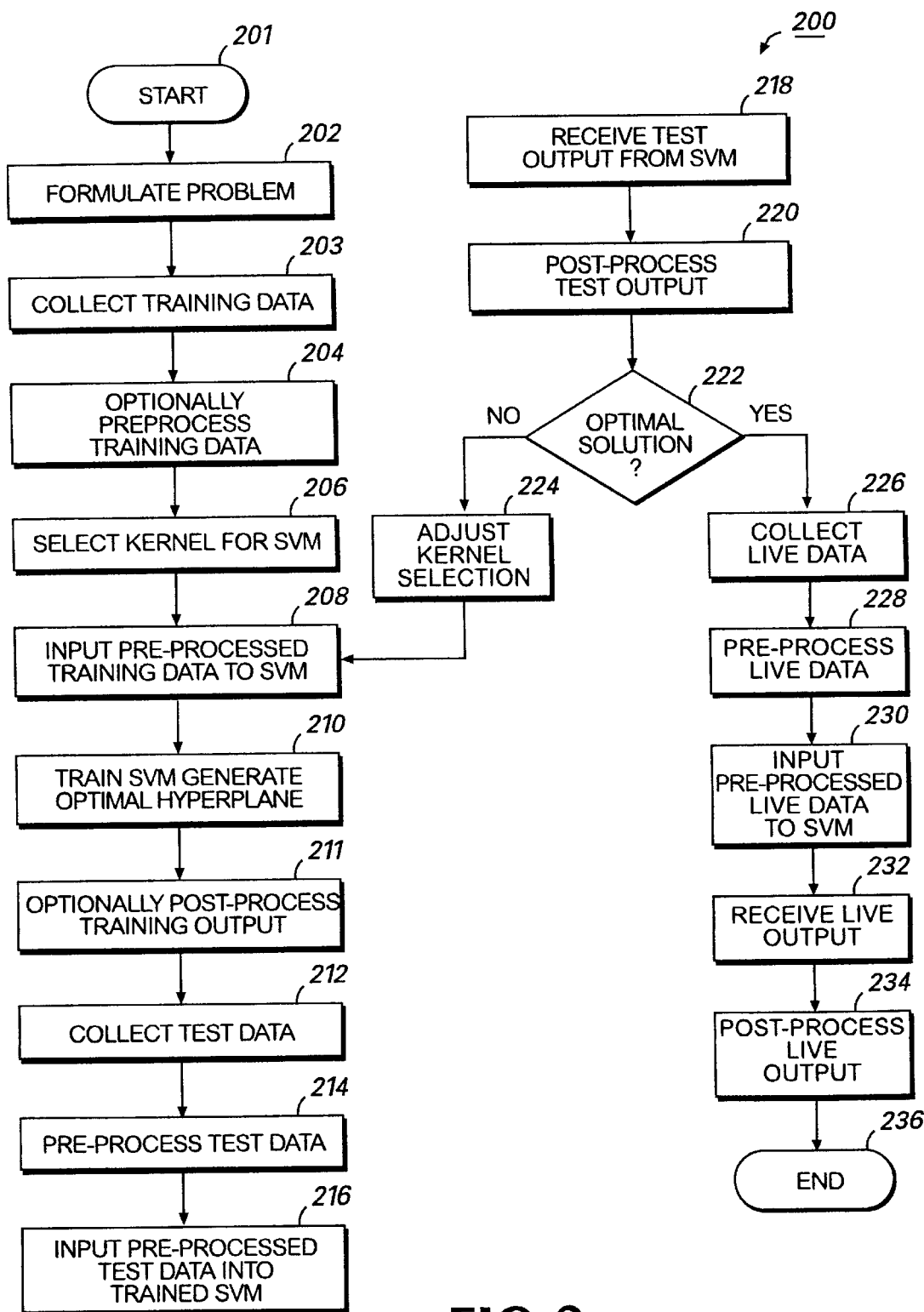
FIG. 2 is a flowchart illustrating an exemplary method for increasing knowledge that may be discovered from data using a support vector machine.

FIG. 2 is a flow chart illustrating an exemplary method 200 for enhancing knowledge that may be discovered from data using a specific type of learning machine known as a support vector machine (SVM). A SVM implements a specialized algorithm for providing generalization when estimating a multi-dimensional function from a limited collection of data. A SVM may be particularly useful in solving dependency estimation problems. More specifically, a SVM may be used accurately in estimating indicator functions (e.g. pattern recognition problems) and real-valued functions (e.g. function approximation problems, regression estimation problems, density estimation problems, and solving inverse problems). The SMV was originally developed by Vladimir N. Vapnik. The concepts underlying the SVM are explained in detail in his book, entitled *Statistical Leaning Theory* (John Wiley & Sons, Inc. 1998), which is herein incorporated by reference in its entirety. Accordingly, a familiarity with SVMs and the terminology used therewith are presumed throughout this specification.

The exemplary method 200 begins at starting block 201 and advances to step 202, where a problem is formulated and then to step 203, where a training data set is collected. As was described with reference to FIG. 1, training data may be collected from one or more local and/or remote sources, through a manual or automated process. At step 204 the training data is optionally pre-processed. Again, pre-processing data comprises enhancing meaning within the training data by cleaning the data, transforming the data and/or expanding the data. Those skilled in the art should appreciate that SVMs are capable of processing input data having extremely large dimensionality. In fact, the larger the dimensionality of the input data, the better generalizations a SVM is able to calculate. Therefore, while training data transformations are possible that do not expand the training data, in the specific context of SVMs it is preferable that training data be expanded by adding meaningful information thereto.

At step 206 a kernel is selected for the SVM. As is known in the art, different kernels will cause a SVM to produce varying degrees of quality in the output for a given set of input data. Therefore, the selection of an appropriate kernel may be essential to the desired quality of the output of the SVM. In one embodiment of the present invention, a kernel may be chosen based on prior performance knowledge. As is known in the art, exemplary kernels include polynomial kernels, radial basis classifier kernels, linear kernels, etc. In an alternate embodiment, a customized kernel may be created that is specific to a particular problem or type of data set. In yet another embodiment, the multiple SVMs may be trained and tested simultaneously, each using a different kernel. The quality of the outputs for each simultaneously trained and tested SVM may be compared using a variety of selectable or weighted metrics (see step 222) to determine the most desirable kernel.

Next, at step 208 the pre-processed training data is input into the SVM. At step 210, the SVM is trained using the pre-processed training data to generate an optimal hyper-plane. Optionally, the training output of the SVM may then be post-processed at step 211. Again, post-processing of training output may be desirable, or even necessary, at this point in order to properly calculate ranges or categories for the output. At step 212 test data is collected similarly to previous descriptions of data collection. The test data is pre-processed at step 214 in the same manner as was the training data above. Then, at step 216 the pre-processed test data is input into the SVM for processing in order to determine whether the SVM was trained in a desirable manner. The test output is received from the SVM at step 218 and is optionally post-processed at step 220.

Based on the post-processed test output, it is determined at step 222 whether an optimal minimum was achieved by the SVM. Those skilled in the art should appreciate that a SVM is operable to ascertain an output having a global minimum error. However, as mentioned above output results of a SVM for a given data set will typically vary in relation to the selection of a kernel. Therefore, there are in fact multiple global minimums that may be ascertained by a SVM for a given set of data. As used herein, the term "optimal minimum" or "optimal solution" refers to a selected global minimum that is considered to be optimal (e.g. the optimal solution for a given set of problem specific, pre-established criteria) when compared to other global minimums ascertained by a SVM. Accordingly, at step 222 determining whether the optimal minimum has been ascertained may involve comparing the output of a SVM with a historical or predetermined value. Such a predetermined value may be dependant on the test data set. For example, in the context of a pattern recognition problem where a data point are classified by a SVM as either having a certain characteristic or not having the characteristic, a global minimum error of 50% would not be optimal. In this example, a global minimum of 50% is no better than the result that would be achieved by flipping a coin to determine whether the data point had the certain characteristic. As another example, in the case where multiple SVMs are trained and tested simultaneously with varying kernels, the outputs for each SVM may be compared with each other SVM's outputs to determine the practical optimal solution for that particular set of kernels. The determination of whether an optimal solution has been ascertained may be performed manually or through an automated comparison process.

If it is determined that the optimal minimum has not been achieved by the trained SVM, the method advances to step 224, where the kernel selection is adjusted. Adjustment of the kernel selection may comprise selecting one or more new kernels or adjusting kernel parameters. Furthermore, in the case where multiple SVMs were trained and tested simultaneously, selected kernels may be replaced or modified while other kernels may be re-used for control purposes. After the kernel selection is adjusted, the method 200 is repeated from step 208, where the pre-processed training data is input into the SVM for training purposes. When it is determined at step 222 that the optimal minimum has been achieved, the method advances to step 226, where live data is collected similarly as described above. The desired output characteristics that were known with respect to the training data and the test data are not known with respect to the live data.

At step 228 the live data is pre-processed in the same manner as was the training data and the test data. At step 230, the live pre-processed data is input into the SVM for processing. The live output of the SVM is received at step 232 and is post-processed at step 234. In one embodiment of the present invention, post-processing comprises converting the output of the SVM into a computationally derived alpha-numerical classifier, for interpretation by a human or computer. Preferably, the alphanumerical classifier comprises a single value that is easily comprehended by the human or computer. The method 200 ends at step 236.

Figure 3:
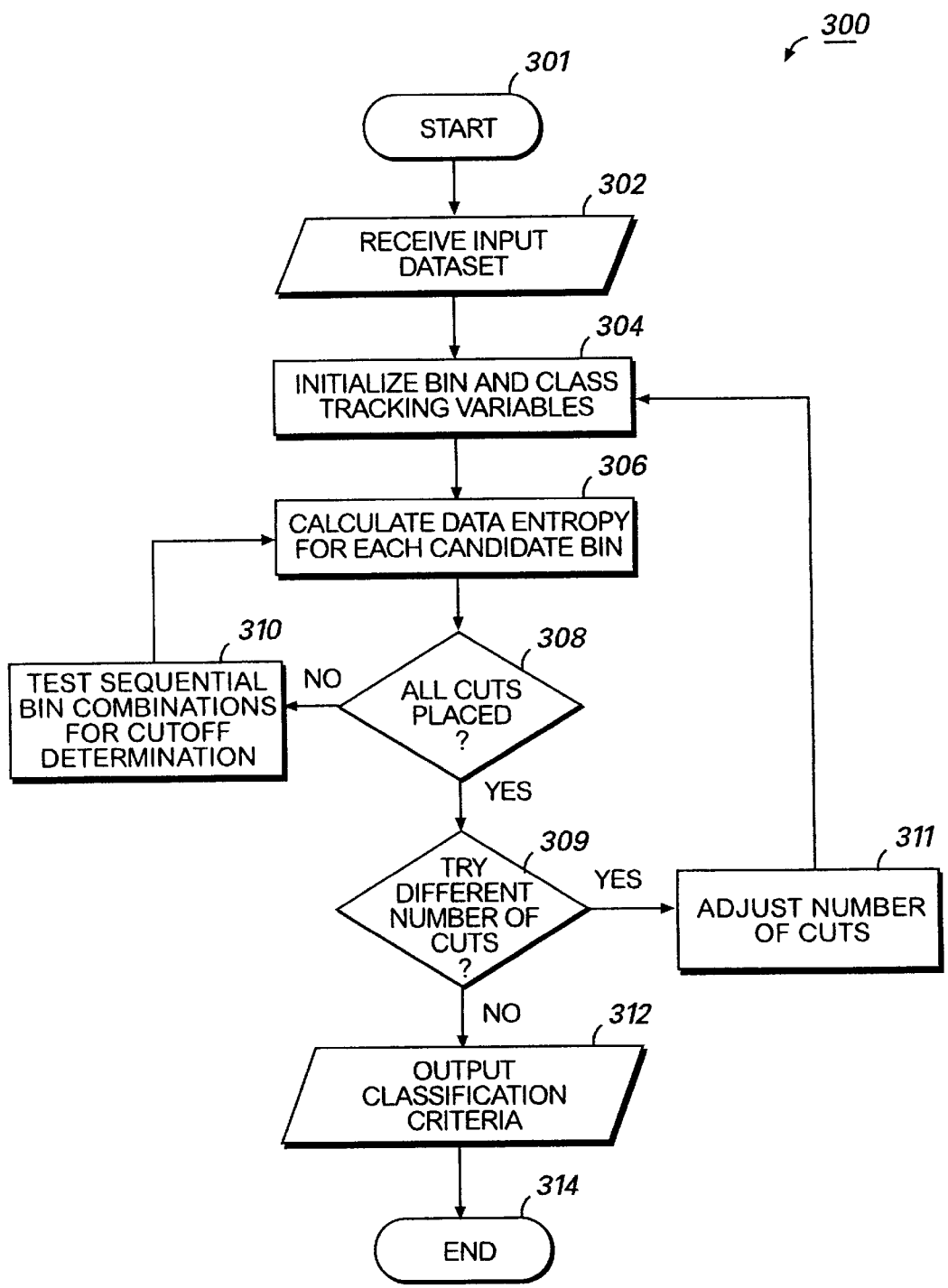
FIG. 3 is a flowchart illustrating an exemplary optimal categorization method that may be used in a stand-alone configuration or in conjunction with a learning machine for preprocessing or post-processing techniques in accordance with an exemplary embodiment of the present invention.

FIG. 3 is a flow chart illustrating an exemplary optimal categorization method 300 that may be used for pre-processing data or post-processing output from a learning machine in accordance with an exemplary embodiment of the present invention. Additionally, as will be described below, the exemplary optimal categorization method may be used as a stand-alone categorization technique, independent from learning machines. The exemplary optimal categorization method 300 begins at starting block 301 and progresses to step 302, where an input data set is received. The input data set comprises a sequence of data samples from a continuous variable. The data samples fall within two or more classification categories. Next, at step 304 the bin and class-tracking variables are initialized. As is known in the art, bin variables relate to resolution and class-tracking variables relate to the number of classifications within the data set. Determining the values for initialization of the bin and class-tracking variables may be performed manually or through an automated process, such as a computer program from analyzing the input data set. At step 306, the data entropy for each bin is calculated. Entropy is a mathematical quantity that measures the uncertainty of a random distribution. In the exemplary method 300, entropy is used to gauge the gradations of the input variable so that maximum classification capability is achieved.

The method 300 produces a series of "cuts" on the continuous variable, such that the continuous variable may be divided into discrete categories. The cuts selected by the exemplary method 300 are optimal in the sense that the average entropy of each resulting discrete category is minimized. At step 308, a determination is made as to whether all cuts have been placed within input data set comprising the continuous variable. If all cuts have not been placed, sequential bin combinations are tested for cutoff determination at step 310. From step 310, the exemplary method 300 loops back through step 306 and returns to step 308 where it is again determined whether all cuts have been placed within input data set comprising the continuous variable. When all cuts have been placed, the entropy for the entire system is evaluated at step 309 and compared to previous results from testing more or fewer cuts. If it cannot be concluded that a minimum entropy state has been determined, then other possible cut selections must be evaluated and the method proceeds to step 311. From step 311 a heretofore untested selection for number of cuts is chosen and the above process is repeated from step 304. When either the limits of the resolution determined by the bin width has been tested or the convergence to a minimum solution has been identified, the optimal classification criteria is output at step 312 and the exemplary optimal categorization method 300 ends at step 314.

The optimal categorization method 300 takes advantage of dynamic programming techniques. As is known in the art, dynamic programming techniques may be used to significantly improve the efficiency of solving certain complex problems through carefully structuring an algorithm to reduce redundant calculations. In the optimal categorization problem, the straightforward approach of exhaustively searching through all possible cuts in the continuous variable data would result in an algorithm of exponential complexity and would render the problem intractable for even moderate sized inputs. By taking advantage of the additive property of the target function, in this problem the average entropy, the problem may be divide into a series of sub-problems. By properly formulating algorithmic sub-structures for solving each sub-problem and storing the solutions of the sub-problems, a great amount of redundant computation may be identified and avoided. As a result of using the dynamic programming approach, the exemplary optimal categorization method 300 may be implemented as an algorithm having a polynomial complexity, which may be used to solve large sized problems.

As mentioned above, the exemplary optimal categorization method 300 may be used in pre-processing data and/or post-processing the output of a learning machine. For example, as a pre-processing transformation step, the exemplary optimal categorization method 300 may be used to extract classification information from raw data. As a post-processing technique, the exemplary optimal range categorization method may be used to determine the optimal cut-off values for markers objectively based on data, rather than relying on ad hoc approaches. As should be apparent, the exemplary optimal categorization method 300 has applications in pattern recognition, classification, regression problems, etc. The exemplary optimal categorization method 300 may also be used as a stand-alone categorization technique, independent from SVMs and other learning machines. An exemplary stand-alone application of the optimal categorization method 300 will be described with reference to FIG. 8.

FIG. 4 illustrates an exemplary unexpanded data set 400 that may be used as input for a support vector machine. This data set 400 is referred to as "unexpanded" because no additional information has been added thereto. As shown, the unexpanded data set comprises a training data set 402 and a test data set 404. Both the unexpanded training data set 402 and the unexpanded test data set 404 comprise data points, such as exemplary data point 406, relating to historical clinical data from sampled medical patients. The data set 400 may be used to train a SVM to determine whether a breast cancer patient will experience a recurrence or not.

Each data point includes five input coordinates, or dimensions, and an output classification shown as 406a–f which represent medical data collected for each patient. In particular, the first coordinate 406a represents "Age," the second coordinate 406b represents "Estrogen Receptor Level," the third coordinate 406c represents "Progesterone Receptor Level," the fourth coordinate 406d represents "Total Lymph Nodes Extracted," the fifth coordinate 406e represents "Positive (Cancerous) Lymph Nodes Extracted," and the output classification 406f, represents the "Recurrence Classification." The important known characteristic of the data 400 is the output classification 406f (Recurrence Classification), which, in this example, indicates whether the sampled medical patient responded to treatment favorably without recurrence of cancer ("−1") or responded to treatment negatively with recurrence of cancer ("1"). This known characteristic will be used for learning while processing the training data in the SVM, will be used in an evaluative fashion after the test data is input into the SVM thus creating a "blind" test, and will obviously be unknown in the live data of current medical patients.

FIG. 5 illustrates an exemplary test output 502 from a SVM trained with the unexpanded training data set 402 and tested with the unexpanded data set 404 shown in FIG. 4. The test output 502 has been post-processed to be comprehensible by a human or computer. As indicated, the test output 502 shows that 24 total samples (data points) were examined by the SVM and that the SVM incorrectly identified four of eight positive samples (50%) and incorrectly identified 6 of sixteen negative samples (37.5%).

FIG. 6 illustrates an exemplary expanded data set 600 that may be used as input for a support vector machine. This data set 600 is referred to as "expanded" because additional information has been added thereto. Note that aside from the added information, the expanded data set 600 is identical to the unexpanded data set 400 shown in FIG. 4. The additional information supplied to the expanded data set has been supplied using the exemplary optimal range categorization method 300 described with reference to FIG. 3. As shown, the expanded data set comprises a training data set 602 and a test data set 604. Both the expanded training data set 602 and the expanded test data set 604 comprise data points, such as exemplary data point 606, relating to historical data from sampled medical patients. Again, the data set 600 may be used to train a SVM to learn whether a breast cancer patient will experience a recurrence of the disease.

Through application of the exemplary optimal categorization method 300, each expanded data point includes twenty coordinates (or dimensions) 606$a$1–3 through 606$e$1–3, and an output classification 606$f$, which collectively represent medical data and categorization transformations thereof for each patient. In particular, the first coordinate 606$a$ represents "Age," the second coordinate through the fourth coordinate 606$a$1–606$a$3 are variables that combine to represent a category of age. For example, a range of ages may be categorized, for example, into "young" "middle-aged" and "old" categories respective to the range of ages present in the data. As shown, a string of variables "0" (606$a$1), "0" (606$a$2), "1" (606$a$3) may be used to indicate that a certain age value is categorized as "old." Similarly, a string of variables "0" (606$a$1), "1" (606$a$2), "0" (606$a$3) may be used to indicate that a certain age value is categorized as "middle-aged." Also, a string of variables "1" (606$a$1), "0" (606$a$2), "0" (606$a$1) may be used to indicate that a certain age value is categorized as "young." From an inspection of FIG. 6, it may be seen that the optimal categorization of the range of "Age" 606$a$ values, using the exemplary method 300, was determined to be 31–33= "young," 34="middle-aged" and 35–49="old." The other coordinates, namely coordinate 606$b$ "Estrogen Receptors Level," coordinate 606$c$ "Progesterone Receptor Level," coordinate 606$d$ "Total Lymph Nodes Extracted," and coordinate 606$e$ "Positive (Cancerous) Lymph Nodes Extracted," have each been optimally categorized in a similar manner.

FIG. 7 illustrates an exemplary expanded test output 702 from a SVM trained with the expanded training data set 602 and tested with the expanded data set 604 shown in FIG. 6. The expanded test output 702 has been post-processed to be comprehensible by a human or computer. As indicated, the expanded test output 702 shows that 24 total samples (data points) were examined by the SVM and that the SVM incorrectly identified four of eight positive samples (50%) and incorrectly identified four of sixteen negative samples (25%). Accordingly, by comparing this expanded test output 702 with the unexpanded test output 502 of FIG. 5, it may be seen that the expansion of the data points leads to improved results (i.e. a lower global minimum error), specifically a reduced instance of patients who would unnecessarily be subjected to follow-up cancer treatments.

Figure 8:
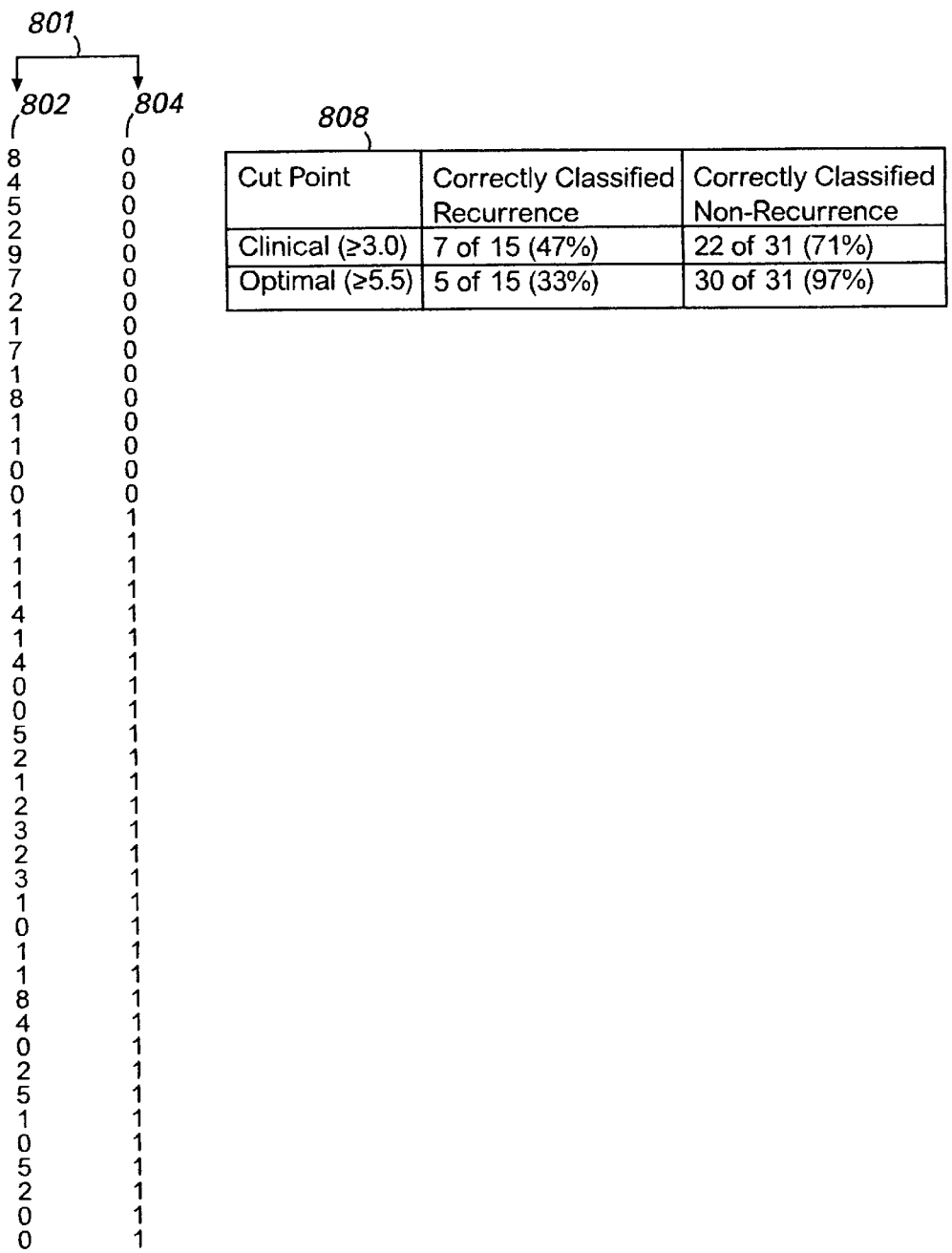
FIG. 8 illustrates exemplary input and output for a standalone application of the optimal categorization method of FIG. 3.

FIG. 8 illustrates an exemplary input and output for a stand alone application of the optimal categorization method 300 described in FIG. 3. In the example of FIG. 8, the input data set 801 comprises a "Number of Positive Lymph Nodes" 802 and a corresponding "Recurrence Classification" 804. In this example, the optimal categorization method 300 has been applied to the input data set 801 in order to locate the optimal cutoff point for determination of treatment for cancer recurrence, based solely upon the number of positive lymph nodes collected in a post-surgical tissue sample. The well-known clinical standard is to prescribe treatment for any patient with at least three positive nodes. However, the optimal categorization method 300 demonstrates that the optimal cutoff 806, based upon the input data 801, should be at the higher value of 5.5 lymph nodes, which corresponds to a clinical rule prescribing follow-up treatments in patients with at least six positive lymph nodes.

As shown in the comparison table 808, the prior art accepted clinical cutoff point ($\geq 3.0$) resulted in 47% correctly classified recurrences and 71% correctly classified non-recurrences. Accordingly, 53% of the recurrences were incorrectly classified (further treatment was improperly not recommended) and 29% of the non-recurrences were incorrectly classified (further treatment was incorrectly recommended). By contrast, the cutoff point determined by the optimal categorization method 300 ($\geq 5.5$) resulted in 33% correctly classified recurrences and 97% correctly classified non-recurrences. Accordingly, 67% of the recurrences were incorrectly classified (further treatment was improperly not recommended) and 3% of the non-recurrences were incorrectly classified (further treatment was incorrectly recommended).

As shown by this example, it may be feasible to attain a higher instance of correctly identifying those patients who can avoid the post-surgical cancer treatment regimes, using the exemplary optimal categorization method 300. Even though the cutoff point determined by the optimal categorization method 300 yielded a moderately higher percentage of incorrectly classified recurrences, it yielded a significantly lower percentage of incorrectly classified non-recurrences. Thus, considering the trade-off, and realizing that the goal of the optimization problem was the avoidance of unnecessary treatment, the results of the cutoff point determined by the optimal categorization method 300 are mathematically superior to those of the prior art clinical cutoff point. This type of information is potentially extremely useful in providing additional insight to patients weighing the choice between undergoing treatments such as chemotherapy or risking a recurrence of breast cancer.

FIG. 9 is a comparison of exemplary post-processed output from a first support vector machine comprising a linear kernel and a second support vector machine comprising a polynomial kernel. FIG. 9 demonstrates that a variation in the selection of a kernel may affect the level of quality of the output of a SVM. As shown, the post-processed output of a first SVM 902 comprising a linear dot product kernel indicates that for a given test set of twenty four sample, six of eight positive samples were incorrectly identified and three of sixteen negative samples were incorrectly identified. By way of comparison, the post-processed output for a second SVM 904 comprising a polynomial kernel indicates that for the same test set only two of eight positive samples were incorrectly identified and four of sixteen negative samples were identified. By way of comparison, the polynomial kernel yielded significantly improved results pertaining to the identification of positive samples and yielded only slightly worse results pertaining to the identification of negative samples. Thus, as will be apparent to those of skill in the art, the global minimum error for the polynomial kernel is lower than the global minimum error for the linear kernel for this data set.

Figure 10:
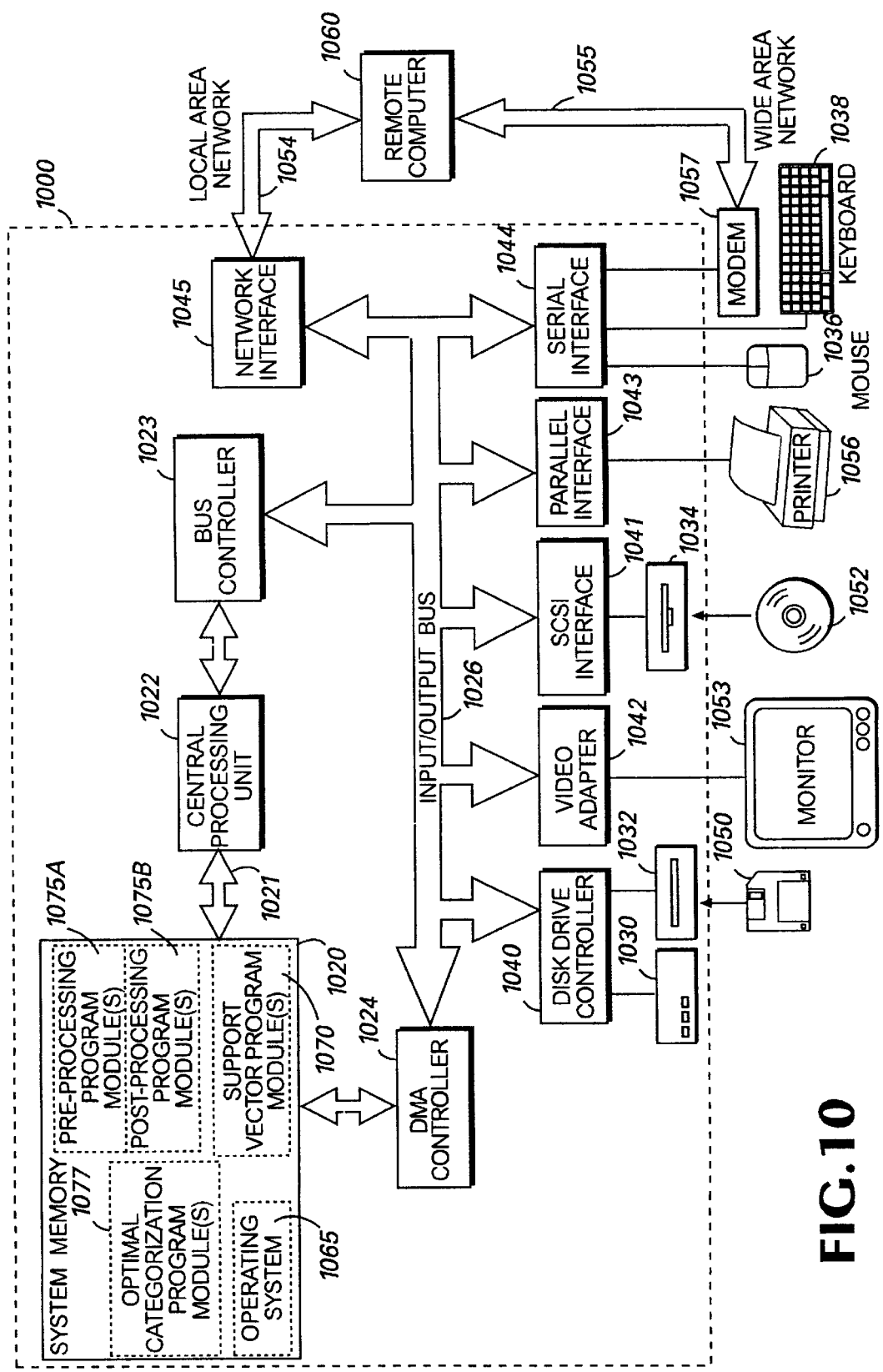
FIG. 10 is a functional block diagram illustrating an exemplary operating environment for an exemplary embodiment of the present invention.

FIG. 10 and the following discussion are intended to provide a brief and general description of a suitable computing environment for implementing the present invention. Although the system shown in FIG. 10 is a conventional personal computer 1000, those skilled in the art will recognize that the invention also may be implemented using other types of computer system configurations. The computer

1000 includes a central processing unit 1022, a system memory 1020, and an Input/Output ("I/O") bus 1026. A system bus 1021 couples the central processing unit 1022 to the system memory 1020. A bus controller 1023 controls the flow of data on the I/O bus 1026 and between the central processing unit 1022 and a variety of internal and external I/O devices. The I/O devices connected to the I/O bus 1026 may have direct access to the system memory 1020 using a Direct Memory Access ("DMA") controller 1024.

The I/O devices are connected to the I/O bus 1026 via a set of device interfaces. The device interfaces may include both hardware components and software components. For instance, a hard disk drive 1030 and a floppy disk drive 1032 for reading or writing removable media 1050 may be connected to the I/O bus 1026 through disk drive controllers 1040. An optical disk drive 1034 for reading or writing optical media 1052 may be connected to the I/O bus 1026 using a Small Computer System Interface ("SCSI") 1041. Alternatively, an IDE (ATAPI) or EIDE interface may be associated with an optical drive such as a may be the case with a CD-ROM drive. The drives and their associated computer-readable media provide nonvolatile storage for the computer 1000. In addition to the computer-readable media described above, other types of computer-readable media may also be used, such as ZIP drives, or the like.

A display device 1053, such as a monitor, is connected to the I/O bus 1026 via another interface, such as a video adapter 1042. A parallel interface 1043 connects synchronous peripheral devices, such as a laser printer 1056, to the I/O bus 1026. A serial interface 1044 connects communication devices to the I/O bus 1026. A user may enter commands and information into the computer 1000 via the serial interface 1044 or by using an input device, such as a keyboard 1038, a mouse 1036 or a modem 1057. Other peripheral devices (not shown) may also be connected to the computer 1000, such as audio input/output devices or image capture devices.

A number of program modules may be stored on the drives and in the system memory 1020. The system memory 1020 can include both Random Access Memory ("RAM") and Read Only Memory ("ROM"). The program modules control how the computer 1000 functions and interacts with the user, with I/O devices or with other computers. Program modules include routines, operating systems 1065, application programs, data structures, and other software or firmware components. In an illustrative embodiment, the present invention may comprise one or more pre-processing program modules 1075A, one or more post-processing program modules 1075B, and/or one or more optimal categorization program modules 1077 and one or more SVM program modules 1070 stored on the drives or in the system memory 1020 of the computer 1000. Specifically, pre-processing program modules 1075A, post-processing program modules 1075B, together with the SVM program modules 1070 may comprise computer-executable instructions for pre-processing data and post-processing output from a learning machine and implementing the learning algorithm according to the exemplary methods described with reference to FIGS. 1 and 2. Furthermore, optimal categorization program modules 1077 may comprise computer-executable instructions for optimally categorizing a data set according to the exemplary methods described with reference to FIG. 3.

The computer 1000 may operate in a networked environment using logical connections to one or more remote computers, such as remote computer 1060. The remote computer 1060 may be a server, a router, a peer device or other common network node, and typically includes many or all of the elements described in connection with the computer 1000. In a networked environment, program modules and data may be stored on the remote computer 1060. The logical connections depicted in FIG. 10 include a local area network ("LAN") 1054 and a wide area network ("WAN") 1055. In a LAN environment, a network interface 1045, such as an Ethernet adapter card, can be used to connect the computer 1000 to the remote computer 1060. In a WAN environment, the computer 1000 may use a telecommunications device, such as a modem 1057, to establish a connection. It will be appreciated that the network connections shown are illustrative and other devices of establishing a communications link between the computers may be used.

Figure 11:
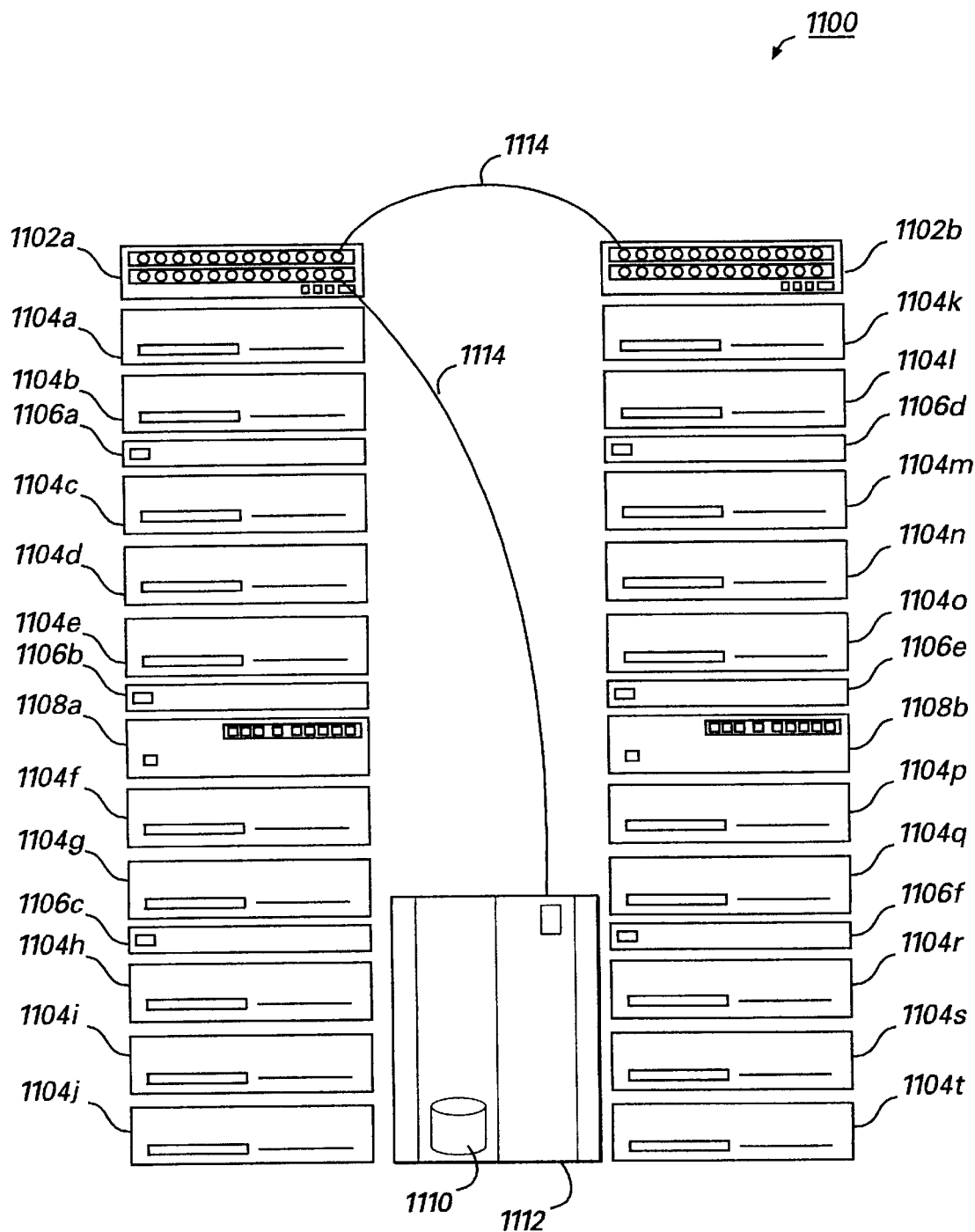
FIG. 11 is a functional block diagram illustrating an alternate exemplary operating environment for an alternate embodiment of the present invention.

FIG. 11 is a functional block diagram illustrating an alternate exemplary operating environment for implementation of the present invention. The present invention may be implemented in a specialized configuration of multiple computer systems. An example of a specialized configuration of multiple computer systems is referred to herein as the BIOWulf™ Support Vector Processor (BSVP). The BSVP combines the latest advances in parallel computing hardware technology with the latest mathematical advances in pattern recognition, regression estimation, and density estimation. While the combination of these technologies is a unique and novel implementation, the hardware configuration is based upon Beowulf supercomputer implementations pioneered by the NASA Goddard Space Flight Center.

The BSVP provides the massively parallel computational power necessary to expedite SVM training and evaluation on large-scale data sets. The BSVP includes a dual parallel hardware architecture and custom parallelized software to enable efficient utilization of both multithreading and message passing to efficiently identify support vectors in practical applications. Optimization of both hardware and software enables the BSVP to significantly outperform typical SVM implementations. Furthermore, as commodity computing technology progresses the upgradability of the BSVP is ensured by its foundation in open source software and standardized interfacing technology. Future computing platforms and networking technology can be assimilated into the BSVP as they become cost effective with no effect on the software implementation.

As shown in FIG. 11, the BSVP comprises a Beowulf class supercomputing cluster with twenty processing nodes 1104a–t and one host node 1112. The processing nodes 1104a–j are interconnected via switch 1102a, while the processing nodes 1104k–t are interconnected via switch 1102b. Host node 1112 is connected to either one of the network switches 1102a or 1102b (1102a shown) via an appropriate Ethernet cable 1114. Also, switch 1102a and switch 1102b are connected to each other via an appropriate Ethernet cable 1114 so that all twenty processing nodes 1104a–t and the host node 1112 are effectively in communication with each other. Switches 1102a and 1102b preferably comprise Fast Ethernet interconnections. The dual parallel architecture of the BSVP is accomplished through implementation of the Beowulf supercomputer's message passing multiple machine parallel configuration and utilizing a high performance dual processor SMP computer as the host node 1112.

In this exemplary configuration, the host node 1112 contains glueless multi-processor SMP technology and consists of a dual 450 Mhz Pentium II Xeon based machine with 18 GB of Ultra SCSI storage, 256 MB memory, two 100 Mbit/sec NIC's, and a 24 GB DAT network backup tape device. The host node 1112 executes NIS, MPL and/or PMV under Linux to manage the activity of the BSVP. The host node 1112 also provides the gateway between the BSVP and the outside world. As such, the internal network of the BSVP is isolated from outside interaction, which allows the entire cluster to appear to function as a single machine.

The twenty processing nodes 1104a–t are identically configured computers containing 150 MHz Pentium processors, 32 MB RAM, 850 MB HDD, 1.44 MB FDD, and a Fast Ethernet mb100 Mb/s NIC. The processing nodes 1104a–t are interconnected with each other and the host node through NFS connections over TCP/IP. In addition to BSVP computations, the processing nodes are configured to provide demonstration capabilities through an attached bank of monitors with each node's keyboard and mouse routed to a single keyboard device and a single mouse device through the KVM switches 1108a and 1108b.

Software customization and development allow optimization of activities on the BSVP. Concurrency in sections of SVM processes is exploited in the most advantageous manner through the hybrid parallelization provided by the BSVP hardware. The software implements full cycle support from raw data to implemented solution. A database engine provides the storage and flexibility required for pre-processing raw data. Custom developed routines automate the pre-processing of the data prior to SVM training. Multiple transformations and data manipulations are performed within the database environment to generate candidate training data.

The peak theoretical processing capability of the BSVP is 3.90 GFLOPS. Based upon the benchmarks performed by NASA Goddard Space Flight Center on their Beowulf class machines, the expected actual performance should be about 1.56 GFLOPS. Thus the performance attained using commodity component computing power in this Beowulf class cluster machine is in line with that of supercomputers such as the Cray J932/8. Further Beowulf testing at research and academic institutions indicates that a performance on the order of 18 times a single processor can generally be attained on a twenty node Beowulf cluster. For example, an optimization problem requiring 17 minutes and 45 seconds of clock time on a single Pentium processor computer was solved in 59 seconds on a Beowulf with 20 nodes. Therefore, the high performance nature of the BSVP enables practical analysis of data sets currently considered too cumbersome to handle by conventional computer systems.

The massive computing power of the BSVP renders it particularly useful for implementing multiple SVMs in parallel to solve real-life problems that involve a vast number of inputs. Examples of the usefulness of SVMs in general and the BSVP in particular comprise: genetic research, in particular the Human Genome Project; evaluation of managed care efficiency; therapeutic decisions and follow up; appropriate therapeutic triage; pharmaceutical development techniques; discovery of molecular structures; prognostic evaluations; medical informatics; billing fraud detection; inventory control; stock evaluations and predictions; commodity evaluations and predictions; and insurance probability estimates.

Those skilled in the art should appreciate that the BSVP architecture described above is illustrative in nature and is not meant to limit the scope of the present invention. For example, the choice of twenty processing nodes was based on the well known Beowulf architecture. However, the BSVP may alternately be implemented using more or less than twenty processing nodes. Furthermore the specific hardware and software components recited above are by way of example only. As mentioned, the BSVP embodiment of the present invention is configured to be compatible with alternate and/or future hardware and software components.

Figure 12:
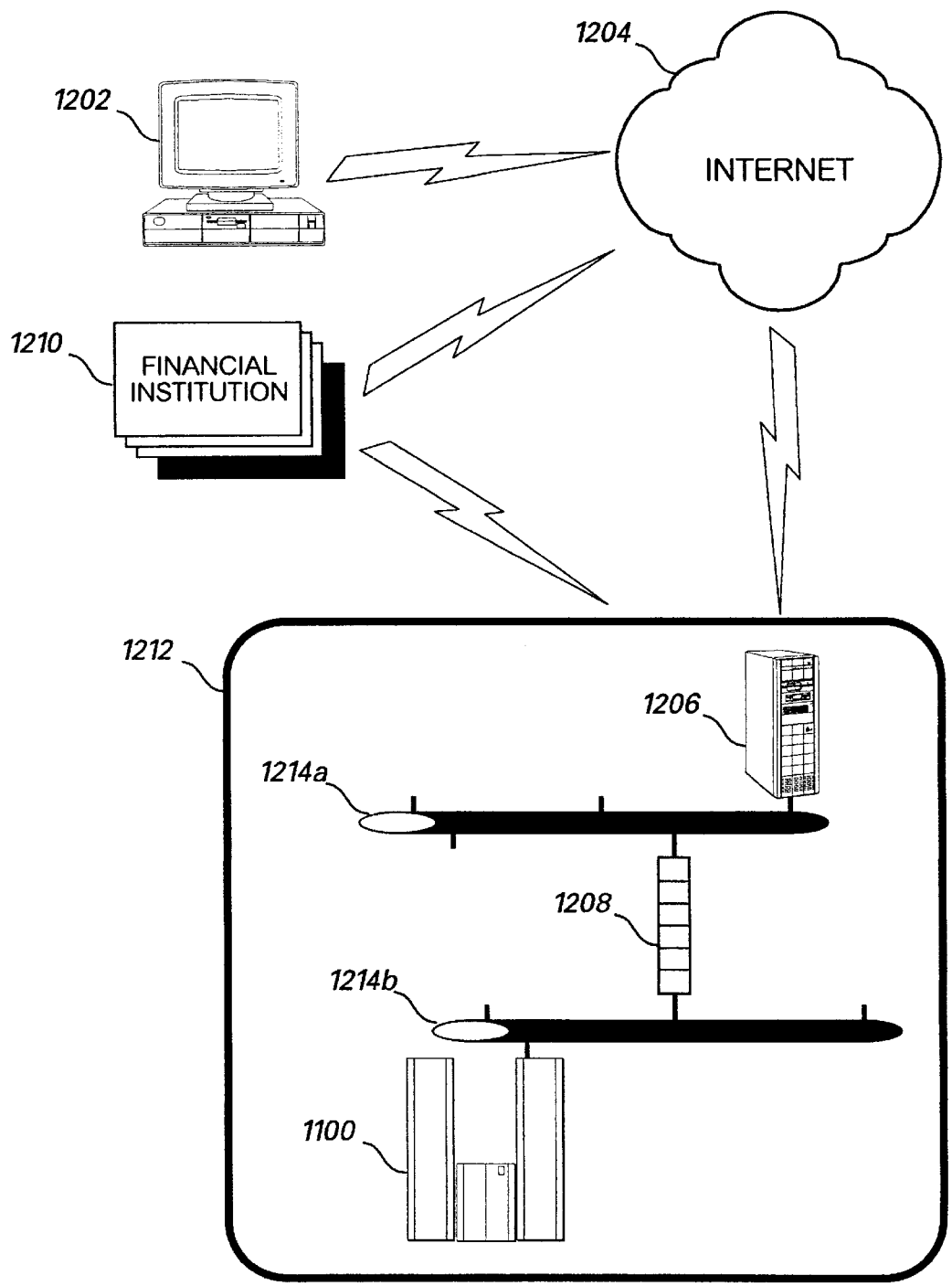
FIG. 12 is a functional block diagram illustrating an exemplary network operating environment for implementation of a further alternate embodiment of the present invention.

FIG. 12 is a functional block diagram illustrating an exemplary network operating environment for implementation of a further alternate embodiment of the present invention. In the exemplary network operating environment, a customer 1202 or other entity may transmit data via a distributed computer network, such as the Internet 1204, to a vendor 1212. Those skilled in the art should appreciate that the customer 1202 may transmit data from any type of computer or lab instrument that includes or is in communication with a communications device and a data storage device. The data transmitted from the customer 1202 may be training data, test data and/or live data to be processed by a learning machine. The data transmitted by the customer is received at the vendor's web server 1206, which may transmit the data to one or more learning machines via an internal network 1214a–b. As previously described, learning machines may comprise SVMs, BSVPs 1100, neural networks, other learning machines or combinations thereof. Preferable, the web server 1206 is isolated from the learning machine(s) by way of a firewall 1208 or other security system. The vendor 1212 may also be in communication with one or more financial institutions 1210, via the Internet 1204 or any dedicated or on-demand communications link. The web server 1206 or other communications device may handle communications with the one or more financial institutions. The financial institution(s) may comprise banks, Internet banks, clearing houses, credit or debit card companies, or the like.

In operation, the vendor may offer learning machine processing services via a web-site hosted at the web-server 1206 or another server in communication with the web-server 1206. A customer 1202 may transmit data to the web server 1206 to be processed by a learning machine. The customer 1202 may also transmit identification information, such as a username, a password and/or a financial account identifier, to the web-server. In response to receiving the data and the identification information, the web server 1206 may electronically withdraw a pre-determined amount of funds from a financial account maintained or authorized by the customer 1202 at a financial institution 1210. In addition, the web server may transmit the customer's data to the BSVP 1100 or other learning machine. When the BSVP 1100 has completed processing of the data and post-processing of the output, the post-processed output is returned to the web-server 1206. As previously described, the output from a learning machine may be post-processed in order to generate a single-valued or multi-valued, computationally derived alpha-numerical classifier, for human or automated interpretation. The web server 1206 may then ensure that payment from the customer has been secured before the post-processed output is transmitted back to the customer 1202 via the Internet 1204.

SVMs may be used to solve a wide variety of real-life problems. For example, SVMs may have applicability in analyzing accounting and inventory data, stock and commodity market data, insurance data, medical data, etc. As such, the above-described network environment has wide applicability across many industries and market segments. In the context of inventory data analysis, for example, a customer may be a retailer. The retailer may supply inventory and audit data to the web server 1206 at predetermined times. The inventory and audit data may be processed by the BSVP and/or one or more other learning machine in order to evaluate the inventory requirements of the retailer. Similarly, in the context of medical data analysis, the customer may be a medical laboratory and may transmit live data collected from a patient to the web server 1206 while the patient is present in the medical laboratory. The output generated by processing the medical data with the BSVP or other learning machine may be transmitted back to the medical laboratory and presented to the patient.

Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. A system for enhancing knowledge discovery using a support vector machine comprising:
    a server in communication with a distributed network for receiving a training data set, a test data set, a live data set and a financial account identifier from a remote source, the remote source also in communication with the distributed network;
    one or more storage devices in communication with the server for storing the training data set and the test data set;
    a processor for executing a support vector machine;
    the processor further operable for:
        collecting the training data set from the one or more storage devices,
        pre-processing the training data set to add dimensionality to each of a plurality of training data points,
        inputting the pre-processed training data set into the support vector machine so as to train the support vector machine,
        in response to training of the support vector machine, collecting the test data set from the one or more storage devices,
        pre-processing the test data set to add dimensionality to each of a plurality of test data points,
        inputting the test data set into the trained support vector machine in order to test the support vector machine,
        in response to receiving a test output from the trained support vector machine, collecting the live data set,
        inputting the live data set into the tested and trained support vector machine in order to process the live data,
        in response to receiving a live output from the support vector machine, post-processing the live output to derive a computationally based alphanumerical classifier, and
        transmitting the alphanumerical classifier to the server;
    wherein the server is further operable for:
        communicating with a financial institution in order to receive funds from a financial account identified by the financial account identifier, and
        in response to receiving the funds, transmitting the alphanumerical classifier to the remote source or another remote source.

2. The system of claim 1,
    wherein pre-processing the training data set further comprises:
    determining that at least one of the training data points is dirty; and
    in response to determining that one of the training data points is dirty, cleaning the dirty training data point.

3. The system of claim 2, wherein each training data point comprises a vector having one or more coordinates; and wherein cleaning the training data point comprises deleting, repairing or replacing one or more of the coordinates of the data point.

4. The system of claim 1, wherein each training data point comprises a vector having one or more original coordinates; and
    wherein pre-processing the training data set comprises adding one or more new coordinates to the vector.

5. The system of claim 4, wherein the one or more new coordinates added to the vector are derived by applying a transformation to one or more of the original coordinates.

6. The system of claim 5, wherein the transformation is based on expert knowledge.

7. The system of claim 5, wherein the transformation is computationally derived.

8. The system of claim 5, wherein the training data set comprises a continuous variable; and
    wherein the transformation comprises optimally categorizing the continuous variable of the training data set.

9. The system of claim 1, wherein the knowledge to be discovered from the data relates to a regression or density estimation;
    wherein the support vector machine produces a training output comprising a continuous variable; and
    wherein the processor is further operable for post-processing the training output by optimally categorizing the training output to derive cutoff points in the continuous variable.

10. The system of claim 1, further comprising a plurality of additional processors for executing a plurality of additional support vector machines, each support vector machine comprising a different kernel; and
    wherein one of the processors is further operable for:
        receiving test output from each of the support vector machines,
        comparing each of the test outputs with each other to determine that none of the test outputs is the optimal solution;
        adjusting the different kernels of one or more of the plurality of support vector machines; and
        in response to adjusting the different kernels, retraining and retesting each of the plurality of support vector machines.

11. A system for enhancing the discovery of knowledge relating to a regression or density estimation using a support vector machine comprising:
    a server in communication with a distributed network for receiving a training data set, a test data set, a live data set and a financial account identifier from a remote source, the remote source also in communication with the distributed network;
    one or more storage devices in communication with the server for storing the training data set and the test data set;
    a processor for executing a support vector machine;
    the processor further operable for:
        collecting the training data set from the one or more storage devices,
        pre-processing the training data set to alter dimensionality to each of a plurality of training data points,
        inputting the pre-processed training data set into the support vector machine so as to train the support vector machine and to produces a training output comprising a continuous variable,
        post-processing the training output by optimally categorizing the training output to derive cutoff points in the continuous variable, in response to post-processing the training output, collecting the test data set from the one or more storage devices, pre-processing the test data set to alter dimensionality to each of a plurality of test data points, inputting the test data set into the trained support vector machine in order to test the support vector machine, in response to receiving a test output from the trained support vector machine, collecting the live data set, inputting the live data set into the tested and trained support vector machine in order to process the live data, in response to receiving a live output from the support vector machine, post-processing the live output to derive a computationally based alphanumerical classifier, and transmitting the alphanumerical classifier to the server;

wherein the server is further operable for:

communicating with a financial institution in order to receive funds from a financial account identified by the financial account identifier, and in response to receiving the funds, transmitting the alphanumerical classifier to the remote source or another remote source.

12. The system of claim 11, wherein pre-processing the training data set comprises:

determining that at least one of the training data points is dirty; and in response to determining that one of the training data points is dirty, cleaning the dirty training data point.

13. The system of claim 12, wherein each training data point comprises a vector having one or more coordinates; and wherein cleaning the training data point comprises deleting, repairing or replacing one or more of the coordinates of the data point.

14. The system of claim 1, wherein each training data point comprises a vector having one or more original coordinates; and wherein pre-processing the training data set comprises adding one or more new coordinates to the vector.

15. The system of claim 14, wherein the one or more new coordinates added to the vector are derived by applying a transformation to one or more of the original coordinates.

16. The system of claim 15, wherein the transformation is based on expert knowledge.

17. The system of claim 15, wherein the transformation is computationally derived.

18. The system of claim 11, further comprising a plurality of additional processors for executing a plurality of additional support vector machines, each support vector machine comprising a different kernel; and wherein one of the processors is further operable for:

receiving test output from each of the support vector machines, comparing each of the test outputs with each other to determine that none of the test outputs is the optimal solution;

adjusting the different kernels of one or more of the plurality of support vector machines; and in response to adjusting the different kernels, retraining and retesting each of the plurality of support vector machines.

19. A system for enhancing knowledge discovery using multiple support vector machine comprising:

a server in communication with a distributed network for receiving a training data set, a test data set, a live data set and a financial account identifier from a remote source, the remote source also in communication with the distributed network;

one or more storage devices in communication with the server for storing the training data set and the test data set;

a plurality of processors for executing a plurality of support vector machines, each support vector machine comprising a different kernel;

each processor further operable for:

collecting the training data set from the one or more storage devices, pre-processing the training data set to alter dimensionality to each of a plurality of training data points, inputting the pre-processed training data set into the support vector machine so as to train the support vector machine, in response to training of the support vector machine, collecting the test data set from the one or more storage devices, pre-processing the test data set to alter dimensionality to each of a plurality of test data points, and inputting the test data set into the trained support vector machine in order to test the support vector machine;

wherein one of the processors is further operable for:

receiving test output from each of the support vector machines, comparing each of the test outputs with each other to determine that none of the test outputs is the optimal solution, adjusting the different kernels of one or more of the plurality of support vector machines, in response to adjusting the different kernels, retraining and retesting each of the plurality of support vector machines until the optimal solution is reached, the optimal solution indicating that one of the support vector machines is an optimal support vector machine comprising an optimal kernel;

wherein the processor of the optimal support vector machine is further operable for:

collecting and processing the live data set in order to produce a live output, post-processing the live output to derive a computationally based alphanumerical classifier, and transmitting the alphanumerical classifier to the server; and wherein the server is further operable for:

communicating with a financial institution in order to receive funds from a financial account identified by the financial account identifier, and in response to receiving the funds, transmitting the alphanumerical classifier to the remote source or another remote source.

20. The system of claim 19, wherein pre-processing the training data set comprises:

determining that at least one of the training data points is dirty; and in response to determining that one of the training data points is dirty, cleaning the dirty training data point.

21. The system of claim 20, wherein each training data point comprises a vector having one or more coordinates; and wherein cleaning the training data point comprises deleting, repairing or replacing one or more of the coordinates of the data point.

22. The system of claim 19, wherein each training data point comprises a vector having one or more original coordinates; and wherein pre-processing the training data set comprises adding one or more new coordinates to the vector.

23. The system of claim 22, wherein the one or more new coordinates added to the vector are derived by applying a transformation to one or more of the original coordinates.

24. The system of claim 23, wherein the transformation is based on expert knowledge.

25. The system of claim 23, wherein the transformation is computationally derived.

26. The system of claim 23, wherein the training data set comprises a continuous variable; and wherein the transformation comprises optimally categorizing the continuous variable of the training data set.

27. The system of claim 19, wherein the knowledge to be discovered from the data relates to a regression or density estimation;

wherein each of the support vector machines produces a training output comprising a continuous variable; and wherein each of the processors is further operable for post-processing the training output by optimally categorizing the training output to derive cutoff points in the continuous variable.

\* \* \* \* \*